US011065851B2

(12) United States Patent
Nakashima et al.

(10) Patent No.: US 11,065,851 B2
(45) Date of Patent: *Jul. 20, 2021

(54) MULTILAYER HARD COATING FILM

(71) Applicant: RIKEN TECHNOS CORPORATION, Tokyo (JP)

(72) Inventors: Kohei Nakashima, Tokyo (JP); Hideaki Yambe, Tokyo (JP); Nozomu Washio, Tokyo (JP); Taketo Hashimoto, Tokyo (JP)

(73) Assignee: RIKEN TECHNOS CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 15/559,400

(22) PCT Filed: Feb. 5, 2016

(86) PCT No.: PCT/JP2016/053556
§ 371 (c)(1),
(2) Date: Sep. 18, 2017

(87) PCT Pub. No.: WO2016/147739
PCT Pub. Date: Sep. 22, 2016

(65) Prior Publication Data
US 2018/0072029 A1 Mar. 15, 2018

(30) Foreign Application Priority Data

Mar. 18, 2015 (JP) ................................. 2015-054437
Feb. 2, 2016 (JP) .............................. JP2016-017706

(51) Int. Cl.
*B32B 27/18* (2006.01)
*B32B 27/36* (2006.01)
(Continued)

(52) U.S. Cl.
CPC .............. *B32B 27/18* (2013.01); *B29C 48/21* (2019.02); *B32B 7/02* (2013.01); *B32B 7/12* (2013.01);
(Continued)

(58) Field of Classification Search
None
See application file for complete search history.

(56) References Cited

U.S. PATENT DOCUMENTS 3,496,143 A 2/1970 Siggel et al.
6,055,823 A 5/2000 Baker et al.
(Continued)

FOREIGN PATENT DOCUMENTS

CN 1649733 A 8/2005
CN 102686642 A 9/2012
(Continued)

OTHER PUBLICATIONS

CN201580003516.4 Office Action dated Jun. 28, 2017; 22 pgs.
(Continued)

*Primary Examiner* — Frank J Vineis
*Assistant Examiner* — Nicole T Gugliotta
(74) *Attorney, Agent, or Firm* — Bracewell LLP; Brad Y. Chin

(57) ABSTRACT

One embodiment provides a multilayer hard coating film which sequentially includes, from the superficial layer side, a first hard coating and a resin film, and wherein: the first hard coating is formed from a coating material that contains a specific amount of (A) a polyfunctional (meth)acrylate and a specific amount of (B) a water repellent agent, while containing no inorganic particles; and the resin film includes at least one layer of (α) an acrylic resin that contains 50-95% by mole of a structural unit derived from methyl methacrylate and 50-5% by mole of a structural unit derived from (Continued)

vinyl cyclohexane when the total of the structural units derived from polymerizable monomers is taken as 100% by mole. Another embodiment provides a multilayer hard coating film which includes a second hard coating in addition to a first hard coating, and wherein: the first hard coating contains (C) a silane coupling agent in addition to the above-described components (A) and (B); and the second hard coating is formed from a coating material that contains a specific amount of (A) a polyfunctional (meth)acrylate and a specific amount of (D) inorganic fine particles having an average particle diameter of 1-300 nm.

19 Claims, 4 Drawing Sheets

(51) Int. Cl.
  B32B 7/02      (2019.01)
  B32B 7/12      (2006.01)
  B32B 38/00     (2006.01)
  B32B 27/20     (2006.01)
  B32B 27/30     (2006.01)
  B29C 48/21     (2019.01)
  C08J 7/043     (2020.01)
  C08J 7/046     (2020.01)
  C09D 7/40      (2018.01)

(52) U.S. Cl.
  CPC ............. *B32B 27/20* (2013.01); *B32B 27/30* (2013.01); *B32B 27/365* (2013.01); *B32B 38/0004* (2013.01); *C08J 7/043* (2020.01); *C08J 7/046* (2020.01); *C09D 7/40* (2018.01); *B32B 2255/10* (2013.01); *B32B 2255/26* (2013.01); *B32B 2255/28* (2013.01); *B32B 2307/412* (2013.01); *B32B 2457/208* (2013.01); *G06F 2203/04103* (2013.01)

(56) References Cited

U.S. PATENT DOCUMENTS

| | | | |
|---|---|---|---|
| 6,489,015 | B1 | 12/2002 | Tsuchiya et al. |
| 10,596,739 | B2 | 3/2020 | Washio et al. |
| 2003/0022987 | A1 | 1/2003 | Kawase et al. |
| 2005/0249942 | A1* | 11/2005 | Coggio ................... B32B 27/18 |
| | | | 428/336 |
| 2006/0134400 | A1 | 6/2006 | Takada et al. |
| 2006/0210727 | A1 | 9/2006 | Ibuki et al. |
| 2007/0231566 | A1 | 10/2007 | Yoneyama et al. |
| 2007/0291363 | A1 | 12/2007 | Asakura et al. |
| 2010/0147191 | A1 | 6/2010 | Sakano et al. |
| 2010/0210812 | A1 | 8/2010 | Urakawa et al. |
| 2012/0114892 | A1 | 5/2012 | Jung et al. |
| 2013/0059158 | A1 | 3/2013 | Oguro et al. |
| 2013/0084458 | A1 | 4/2013 | Yamada et al. |
| 2013/0216801 | A1 | 8/2013 | Kadoki et al. |
| 2013/0222906 | A1 | 8/2013 | Tsunekawa et al. |
| 2014/0044891 | A1* | 2/2014 | Shibata ................... G02B 1/04 |
| | | | 428/1.31 |
| 2014/0208657 | A1 | 7/2014 | Kim et al. |
| 2014/0227482 | A1 | 8/2014 | Shibata et al. |
| 2014/0360975 | A1 | 12/2014 | Hustad et al. |
| 2015/0203711 | A1 | 7/2015 | Kang et al. |
| 2016/0122525 | A1* | 5/2016 | Carloff ................... C08L 23/12 |
| | | | 428/215 |
| 2016/0122573 | A1 | 5/2016 | Uprety et al. |
| 2016/0214294 | A1 | 7/2016 | Tsujimura et al. |
| 2016/0229159 | A1 | 8/2016 | Nakashima et al. |
| 2017/0095993 | A1 | 4/2017 | Tomomatsu et al. |
| 2017/0183543 | A1 | 6/2017 | Nagata et al. |
| 2017/0198164 | A1 | 7/2017 | Itagaki et al. |
| 2018/0072029 | A1 | 3/2018 | Nakashima et al. |

FOREIGN PATENT DOCUMENTS

| | | | |
|---|---|---|---|
| CN | 103492913 A | 1/2014 | |
| CN | 104422239 A | 3/2015 | |
| CN | 105404094 A | 3/2016 | |
| EP | 2873692 A1 | 5/2015 | |
| JP | S633011 A | 1/1988 | |
| JP | H0211665 A | 1/1990 | |
| JP | H0419142 A | 1/1992 | |
| JP | H0794061 A | 4/1995 | |
| JP | 2000052472 A | 2/2000 | |
| JP | 2000190430 A | 7/2000 | |
| JP | 2000214791 A | 8/2000 | |
| JP | 2000517455 A | 12/2000 | |
| JP | 2002062405 A | 2/2002 | |
| JP | 2004109966 A | 4/2004 | |
| JP | 2005148444 A | 6/2005 | |
| JP | 2005181940 A | 7/2005 | |
| JP | 2006030983 A | 2/2006 | |
| JP | 2006058574 A | 3/2006 | |
| JP | 2006154758 A | 6/2006 | |
| JP | 2006215488 A | 8/2006 | |
| JP | 2007108449 A | 4/2007 | |
| JP | 2007537059 A | 12/2007 | |
| JP | 2008026883 A | 2/2008 | |
| JP | 2008095064 A | 4/2008 | |
| JP | 2008201864 A | 9/2008 | |
| JP | 2008538195 A | 10/2008 | |
| JP | 2009036818 A | 2/2009 | |
| JP | 2009114248 A | 5/2009 | |
| JP | 2009196125 A | 9/2009 | |
| JP | 2009-279806 | * 12/2009 | ............ B32B 27/36 |
| JP | 2009279806 A | 12/2009 | |
| JP | 2010064332 A | 2/2010 | |
| JP | 2010054861 A | 3/2010 | |
| JP | 2010060190 A | 3/2010 | |
| JP | 2010064332 A | 3/2010 | |
| JP | 2010078642 A | 4/2010 | |
| JP | 2010511206 A | 4/2010 | |
| JP | 2010-131771 | * 6/2010 | ............ B32B 27/20 |
| JP | 2010131771 A | 6/2010 | |
| JP | 2010208035 A | 9/2010 | |
| JP | 2010211150 A | 9/2010 | |
| JP | 2010224150 A | 10/2010 | |
| JP | 2010241019 A | 10/2010 | |
| JP | 2010271400 A | 12/2010 | |
| JP | 2010275385 A | 12/2010 | |
| JP | 2011032350 A | 2/2011 | |
| JP | 2011032350 A1 | 2/2011 | |
| JP | 2011037927 A | 2/2011 | |
| JP | 2011512422 A | 4/2011 | |
| JP | 2011128439 A | 6/2011 | |
| JP | 2011133862 A | 7/2011 | |
| JP | 2011175040 A | 9/2011 | |
| JP | 2011201087 A | 10/2011 | |
| JP | 2011213989 A | 10/2011 | |
| JP | 2012062385 A | 3/2012 | |
| JP | 2012111943 A | 6/2012 | |
| JP | 2012234163 A | 11/2012 | |
| JP | 2012250438 A | 12/2012 | |
| JP | 2013075466 A | 4/2013 | |
| JP | 2013076029 A | 4/2013 | |
| JP | 2013142113 A | 7/2013 | |
| JP | 2013173871 A | 9/2013 | |
| JP | 201431397 A | 2/2014 | |
| JP | 2014024332 A | 2/2014 | |
| JP | 2014025061 A | 2/2014 | |
| JP | 2014040017 A | 3/2014 | |
| JP | 2014043101 A | 3/2014 | |
| JP | 2014062709 A | 4/2014 | |
| JP | 2014080536 A | 5/2014 | |
| JP | 2014117904 A | 6/2014 | |
| JP | 2014143831 A | 8/2014 | |
| JP | 2014152237 A | 8/2014 | |
| JP | 2014152281 A | 8/2014 | |
| JP | 2014201681 A | 10/2014 | |
| JP | 2014238614 A | 12/2014 | |
| JP | 2015013473 A | 1/2015 | |
| JP | 2015016683 A | 1/2015 | |

(56) References Cited

FOREIGN PATENT DOCUMENTS

| | | | | | |
|---|---|---|---|---|---|
| JP | 2015033851 | A | 2/2015 | | |
| JP | 2015034285 | A | 2/2015 | | |
| JP | 2015034286 | A | 2/2015 | | |
| JP | 2015083370 | A | 4/2015 | | |
| JP | 2015151420 | A | 8/2015 | | |
| JP | 2015182272 | A | 10/2015 | | |
| JP | 2015182273 | A | 10/2015 | | |
| JP | 2015203770 | A | 11/2015 | | |
| JP | 2016006160 | A | 1/2016 | | |
| JP | 2016011365 | A | 1/2016 | | |
| JP | 5870222 | B1 | 2/2016 | | |
| JP | 5878255 | A | 3/2016 | | |
| JP | 2016050285 | A | 4/2016 | | |
| JP | 2016060839 | A | 4/2016 | | |
| JP | 2016172423 | A | 9/2016 | | |
| JP | 2016172424 | A | 9/2016 | | |
| JP | WO2015098495 | A1 | 3/2017 | | |
| KR | 1020040094153 | A | 11/2001 | | |
| KR | 20100129512 | A | 12/2010 | | |
| KR | 10-2013-0058565 | * | 4/2014 | ............ | B23B 27/08 |
| KR | 20140056399 | A | 5/2014 | | |
| TW | 200609110 | A | 3/2006 | | |
| TW | 201300236 | A | 1/2013 | | |
| TW | 201420652 | A | 6/2014 | | |
| TW | 201437304 | A | 10/2014 | | |
| TW | 201504320 | A | 2/2015 | | |
| TW | 201602268 | A | 1/2016 | | |
| TW | 201638250 | A | 11/2016 | | |
| WO | 2005113690 | A2 | 12/2005 | | |
| WO | 2006102383 | A1 | 9/2006 | | |
| WO | 2008029766 | A1 | 3/2008 | | |
| WO | 2008067262 | A1 | 6/2008 | | |
| WO | 2009113537 | A1 | 9/2009 | | |
| WO | 2010079653 | A1 | 7/2010 | | |
| WO | 2011033976 | A1 | 3/2011 | | |
| WO | 2011034847 | A1 | 3/2011 | | |
| WO | 2011145630 | A1 | 11/2011 | | |
| WO | 2012026446 | A1 | 3/2012 | | |
| WO | 2012144508 | A1 | 10/2012 | | |
| WO | 2012144510 | A1 | 10/2012 | | |
| WO | 2013129531 | A1 | 9/2013 | | |
| WO | 2014030848 | A1 | 2/2014 | | |
| WO | WO 2015/045823 | * | 9/2014 | ............... | C09D 7/40 |
| WO | 2014203792 | A1 | 12/2014 | | |
| WO | 2015005049 | A1 | 1/2015 | | |
| WO | 2015146565 | A1 | 1/2015 | | |
| WO | 2015033754 | A1 | 3/2015 | | |
| WO | 2015098495 | A1 | 7/2015 | | |
| WO | 2015001948 | A1 | 8/2015 | | |
| WO | 2015171340 | A1 | 11/2015 | | |
| WO | 2015182253 | A1 | 12/2015 | | |
| WO | 2016147424 | A1 | 9/2016 | | |
| WO | 2016147733 | A1 | 9/2016 | | |
| WO | 2016147734 | A1 | 9/2016 | | |
| WO | 2016147739 | A1 | 9/2016 | | |
| WO | 2016147776 | A1 | 9/2016 | | |
| WO | 2017200042 | A | 11/2017 | | |

OTHER PUBLICATIONS

JP2015-054439 Office Action dated Aug. 24, 2016; 31 pgs.
TW104122442 Office Action dated Jul. 13, 2016; 24 pgs.
CN201580003516.4 Office Action dated Jan. 17, 2018; 20 pgs.
Lai, et al., Synthetic Process and Application of Silicone Products, 2nd Edition, Nov. 2009, 4 pgs.
JP6144330 Opposition Paper dated Dec. 5, 2017; 45 PGS.
Yamamoto, et al.; Application of Chemically Absorbed Fluorocarbon Film with Highly Durability as a Mold Release Agent; Seikei-Kakou vol. 22 No. 2, 2010; pp. 104-114.
PCT/JP2016/084794 International Search Report dated Jan. 25, 2017; 2 pgs.
PCT/JP2016/052927 International Search Report dated Apr. 19, 2016; 2 pgs.
PCT/JP2016/052950 International Search Report dated Apr. 19, 2016; 2 pgs.
PCT/JP2016/053357 International Search Report dated May 17, 2016; 2 pgs.
PCT/JP2016/053355 International Search Report dated May 17, 2016; 2 pgs.
PCT/JP2016/054363 International Search Report dated May 17, 2016; 2 pgs.
KR10-2016-7017502 Decision of Rejection dated May 10, 2018; 8 pgs.
KR10-2016-7017502 Office Action dated Oct. 27, 2017; 18pgs.
PCT/JP2016/053556 International Search Report dated May 17, 2016; 2 pgs.
EP16764550.6 Extended European Search Report dated Oct. 18, 2018; 8 pgs.
EP16764607.4 Search Report dated May 28, 2018; 8 pgs.
CN201680015900.0 Office Action dated Nov. 5, 2018; 12 pgs.
PCT/JP2016/084981 International Search Report dated Jan. 25, 2017; 2 pgs.
Artham, et al., Biodegradation of Aliphatic and Aromatic Polycarbonates, Macromol. Biosci, 2008, 8, 14-24. (Year: 2008).
EP15885519.7 Extended European Search Report dated October 18, 2018; 8PGS.
EP16764570.4 Search Report dated May 28, 2018; 8 pgs.
CN201680015984.8 Office Action dated Nov. 5, 2018; 13 pgs.
EP16764565.4 Extended European Search Report dated Oct. 18, 2018; 8 pgs.
EP16764564.7 Extended European Search Report dated Oct. 18, 2018; 8 pgs.
PCT/JP2016/084981 International Preliminary Report on Patentability dated Jun. 21, 2018; 13 pgs.
KR10-2017-7026048 Korean Office Action dated Nov. 1, 2018; 14 pgs.
JP2017069555 Office Action dated Nov. 27, 2018; 8 pgs.
CN201680015850.6 Office Action dated Jan. 24, 2019; 10 pgs.
Dhinese Patent Application No. 201680015900.0 dated Jun. 4, 2019; 8 pgs.
TW105104027 Office Action dated Jun. 25, 2019; 21 pages.
PCT/JP2017/027297 International Search Report dated Aug. 29, 2017; 2 pgs.
JP2017-152119 Office Action dated Aug. 7, 2018; 10 pgs.
TW105104029 Office Action dated Mar. 7, 2019; 12 pgs.
PCT/JP2017/040099 International Search Report dated Feb. 13, 2018; 4 pgs.
CN201680015908.7 Office Action dated Feb. 2, 2019; 12 pgs.
CN201680015902.X Office Action dated Feb. 3, 2019; 15 pgs.
EP16872835.0 Extended European Search Report dated Jul. 8, 2019; 6 pgs.
EP16868622.8 Extended European Search Report dated May 20, 2019; 8 pgs.
CN201680015901.5 Office Action dated Jan. 28, 2019; 12 pgs.
CN201680015902.X Second Office Action dated Jul. 17, 2019; 16 pgs.
KR10-2019-7001505 Office Action dated Feb. 20, 2019; 12 pgs.
Chinese Patent Application No. 201680015984.8 dated Jun. 4, 2019; 8 pgs.
CN201811070889.5 Office Action dated Jan. 10, 2020, 15 pgs.
CN201680068951.X Office Action dated Sep. 29, 2019; 21 pgs.
CN201680015900.0 Office Action dated Sep. 10, 2019; 13 pgs.
JP2016-17863 Office Action dated Oct. 8, 2019; 11 pgs.
CN201810254960.9 Office Action dated Oct. 11, 2019, 13 pgs.
JP2016-29588 Office Action dated Dec. 24, 2019, 7 pgs.
TW105104026 Office Action dated Oct. 5, 2019; 10 pgs.
TW105104240 Office Action dated Oct. 17, 2019, 10 pgs.
CN201680015902.X Office Action dated Jan. 2, 2020, 16 pgs.
CN201680015984.8 Office Action dated Sep. 10, 2019, 13 pgs.
TW105104050 Office Action dated Aug. 20, 2019; 12 pgs.
JP2017-094366 Office Action dated Nov. 18, 2019, 11 pgs.
EP17850559.0 Supplementary Search Report dated Mar. 18, 2020, 10 pgs.
CN201780055888.0 First Office Action dated Jul. 2, 2020, 11 pgs.
EP20150371.1 Extended European Search Report dated Apr. 7, 2020, 8 pgs.

(56) References Cited

OTHER PUBLICATIONS

JP2017-094366 Office Action dated May 11, 2020, 15 pgs.
EP15885519.7 Third Party Observations dated Jan. 8, 2020, 85 pgs.
EP17874537.8 Supplementary Search Report dated May 14, 2020, 12 pgs.
CN201810254960.9 Second Office Action dated Jun. 9, 2020, 11 pgs.
JP2016-24288 Opposition Against JP6599789 dated Jun. 24, 2020, 64 pgs.
A Website of Fluorolink@PFPE (including a flurorine-containing water repellent agent "Fluorolink AD 1700"), https://www.solvay.jp/ja/markets-and-products/featured-products/Fluorolink.html, Jan. 7, 2020, 2pgs.
TW105104907 Office Action dated Oct. 18, 2019; 10 pages.
EP20150365.3 Extended European Search Report dated Apr. 9, 2020, 8 pgs.
EP20150373.7 Extended European Search Report dated Apr. 7, 2020, 9 pgs.
JP6599789B Notice for Reasons for Revocation dated Sep. 29, 2020, 32 pgs.
CN201811070889.5 Second Office Action dated Aug. 3, 2020, 16 pgs.
JP2017-552695 Second Office Action dated Dec. 2, 2020, 5 pgs.
CN201780069802.X Second Office Action dated Nov. 25, 2020, 23 pgs.
CN201910746657.5 First Office Action dated Oct. 27, 2020, 18 pgs.
CN201780069802.X First Office Action dated Jul. 31, 2020, 23 pgs.
TW106125432 First Office Action dated Dec. 28, 2020, 14 pgs.
CN201910756415.4 First Office Action dated Dec. 31, 2020, 9 pgs.
JP2017-094366 Office Action dated Jan. 26, 2021, 18 pgs.
CN201810254960.9 Third Office Action dated Dec. 30, 2020, 16 pgs.
TW105136889 Second Office Action dated Jan. 7, 2021, 9 pgs.
KR10-2017-7026047 Third Party Observation dated Jan. 11, 2021, 21 pgs.
EP20202998.9 Extended European Search Report dated Feb. 1, 2021, 8 pgs.

* cited by examiner

13C-NMR SPECTRUM OF R-A

MULTILAYER HARD COATING FILM

CROSS REFERENCE TO RELATED APPLICATIONS

This application claims the benefit of and priority to PCT/JP2016/053356, filed on Feb. 5, 2016, entitled (translation), "HARD COAT LAMINATED FILM," which claims the benefit of and priority to Japanese Patent Application Nos. 2015-054437, filed on Mar. 18, 2015, and 2015-017706, filed on Feb. 2, 2016, each of which is hereby incorporated by reference in their entirety into this application.

BACKGROUND

Field

Embodiments relate to a hard coat laminated film. More specifically, embodiments relate to a hard coat laminated film having excellent transparency and excellent color tone, and preferably having excellent abrasion resistance and excellent surface hardness.

Description of Related Art

In recent years, a touch panel installed on an image display apparatus such as a liquid crystal display, a plasma display, or an electroluminescence display and capable inputting by touching the touch panel with a finger, a pen, or the like while watching a displayed object, has become popular.

For a display face plate of a touch panel, an article using glass as a substrate thereof has been conventionally used because glass meets required characteristics such as heat resistance, dimensional stability, high transparency, high surface hardness, or high rigidity. On the other hand, glass has disadvantages such as low impact resistance and consequent fragility; low processability; difficulty in handling; a high specific gravity and a consequent heavy weight; and difficulty in satisfying demand for making a display curved or flexible. Therefore, a material substituted for glass has been actively studied, and many hard coat laminated films each having a hard coat excellent in surface hardness and abrasion resistance formed on a surface of a transparent resin film made of triacetylcellulose, polyethylene terephthalate, polycarbonate, polymethyl methacrylate, a norbornene polymer, or the like have been proposed (for example, see JP 2000-052472 A and JP 2000-214791 A). However, abrasion resistance thereof is still insufficient. Therefore, a hard coat laminated film preferably capable of maintaining surface characteristics such as abrasion resistance, surface hardness, or finger slidability even after repeated wipes with a handkerchief or the like has been required.

SUMMARY

An object of the various embodiments is to provide a hard coat laminated film having excellent transparency and excellent color tone, and preferably having excellent abrasion resistance and excellent surface hardness. Another object of the various embodiments is to provide a hard coat laminated film having suitable characteristics as a member of an image display apparatus such as a liquid crystal display, a plasma display, or an electroluminescence display (including an image display apparatus having a touch panel function and an image display apparatus having no touch panel function), particularly as a display face plate of an image display apparatus having a touch panel function.

According to at least one embodiment, the above object can be achieved by a specific resin film and hard coat laminated film.

According to at least one embodiment, there is provided a hard coat laminated film sequentially including, from a surface layer side, a first hard coat and a resin film layer, in which the first hard coat is formed of a coating material including: (A) 100 parts by mass of a polyfunctional (meth) acrylate; and (B) 0.01 to 7 parts by mass of a water repellent agent, and containing no inorganic particles, and the resin film include ($\alpha$) at least one layer of an acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer.

According to another embodiment, there is provided a hard coat laminated film sequentially including, from a surface layer side, a first hard coat, a second hard coat, and a resin film layer, in which the first hard coat is formed of a coating material including: (A) 100 parts by mass of a polyfunctional (meth)acrylate; (B) 0.01 to 7 parts by mass of a water repellent agent; and (C) 0.01 to 10 parts by mass of a silane coupling agent, and containing no inorganic particles, the second hard coat is formed of a coating material including: (A) 100 parts by mass of a polyfunctional (meth) acrylate; and (D) 50 to 300 parts by mass of inorganic fine particles having an average particle diameter of 1 to 300 nm, and the resin film include ($\alpha$) at least one layer of an acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer.

According to at least one embodiment, the resin film is a multilayer resin film obtained by sequentially laminating: ($\alpha$) a layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer; ($\beta$) a layer of an aromatic polycarbonate resin; and ($\alpha$) a layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer, directly in this order.

According to at least one embodiment, the resin film is a multilayer resin film obtained by sequentially laminating: ($\alpha$) a layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer; ($\gamma$) a layer of a resin composition including 100 parts by mass of an acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer, and 1 to 100 parts by mass of a core-shell rubber; and ($\alpha$) a layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer, directly in this order.

According to at least one embodiment, the (B) water repellent agent include a (meth)acryloyl group-containing fluoropolyether water repellent agent.

According to at least one embodiment, the (C) silane coupling agent include one or more selected from the group consisting of a silane coupling agent having an amino group and a silane coupling agent having a mercapto group.

According to at least one embodiment, the second hard coat forming coating material further include (E) 0.01 to 1 part by mass of a leveling agent.

According to at least one embodiment, the first hard coat forming coating material further include (F) 0.01 to 15 parts by mass of resin fine particles having an average particle diameter of 0.5 to 10 μm.

According to at least one embodiment, the thickness of the first hard coat is from 0.5 to 5 μm.

According to at least one embodiment, the thickness of the second hard coat is from 5 to 30 μm.

According to another embodiment, there is provided a hard coat laminated film sequentially including, from a surface layer side, a first hard coat, a second hard coat, and a resin film layer, in which the first hard coat is formed of a coating material containing no inorganic particles, the second hard coat is formed of a coating material containing inorganic particles, the resin film include (α) at least one layer of an acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer, and the following (i) to (iii) are satisfied: (i) a total light transmittance of 85% or more; (ii) a pencil hardness on the first hard coat surface of 5H or more; and (iii) a yellowness index of 3 or less.

According to another embodiment, there is provided a hard coat laminated film sequentially including, from a surface layer side, a first hard coat, a second hard coat, and a resin film layer, in which the first hard coat is formed of a coating material containing no inorganic particles, the second hard coat is formed of a coating material containing inorganic particles, the resin film include (α) at least one layer of an acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer, and the following (iv) and (v) are satisfied: (iv) a water contact angle at the first hard coat surface of 100° or more; and (v) a water contact angle at the first hard coat surface after 20,000 reciprocating wipes with a cotton of 100° or more.

According to at least one embodiment, the resin film is a multilayer resin film obtained by sequentially laminating: (α) a layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer; (β) a layer of an aromatic polycarbonate resin; and (α) a layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer, directly in this order.

According to at least one embodiment, the resin film is a multilayer resin film obtained by sequentially laminating: (α) a layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer; (γ) a layer of a resin composition including 100 parts by mass of an acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer, and 1 to 100 parts by mass of a core-shell rubber; and (α) a layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer, directly in this order.

According to another embodiment, there is provided an article including the hard coat laminated film described above.

Embodiments provide non-obvious advantages over conventional art. For example, a hard coat laminated film according to at least one embodiment has excellent transparency and excellent color tone. A preferable hard coat laminated film according to at least one embodiment is excellent in abrasion resistance and surface hardness in addition to being excellent in transparency and color tone. Therefore, the hard coat laminated film according to at least one embodiment can be suitably used as a member of an image display apparatus such as a liquid crystal display, a plasma display, or an electroluminescence display (including an image display apparatus having a touch panel function and an image display apparatus having no touch panel function), particularly as a display face plate of an image display apparatus having a touch panel function. In addition, the hard coat laminated film according to at least one embodiment can be suitably used as a window, a windshield, or the like for a vehicle, a window, a door, or the like for a building, a protective plate or the like for an electronic signboard, a front panel or the like for a household electric appliance such as a refrigerator, a door or the like for furniture such as a cupboard, a housing or the like for a television, a personal computer, a tablet type information device, or a smartphone, a show window, or the like.

DETAILED DESCRIPTION

Figure 1:
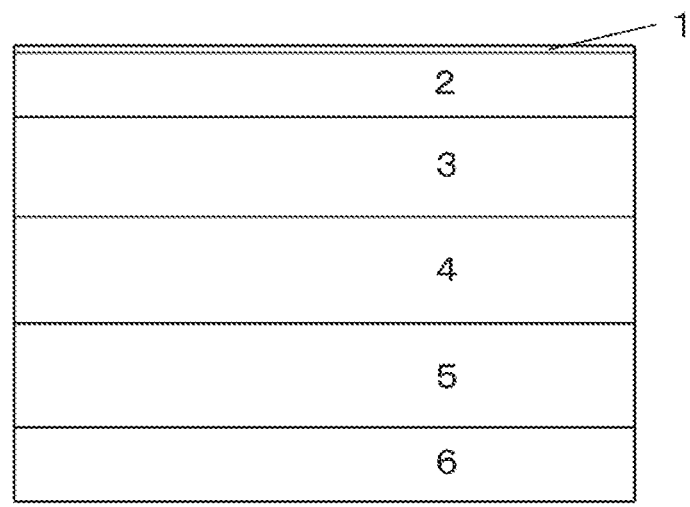
FIG. 1 is a conceptual cross-sectional view exemplifying a hard coat laminated film according to at least one embodiment.

Herein, the term "film" is used as a term including a sheet. The term "resin" is used as a term including a resin mixture including two or more resins and a resin composition including a component other than a resin.

A hard coat laminated film according to at least one embodiment sequentially include, from a surface layer side, a first hard coat and a resin film layer. A hard coat laminated film according to at least one embodiment sequentially include, from a surface layer side, a first hard coat, a second hard coat, and a resin film layer.

The "surface layer side" referred to herein means a side closer to an outer surface (a visible surface in a case of a display face plate) when an article formed of a hard coat laminated film is used on site. In addition, herein, disposing one layer on a "surface layer side" of another layer includes that these layers are in direct contact with each other and that another single layer or a plurality of other layers is interposed therebetween.

First Hard Coat

The first hard coat usually forms a surface of the hard coat laminated film according to at least one embodiment. When the hard coat laminated film according to at least one embodiment is used as a display face plate of an image display apparatus having a touch panel function, the first hard coat usually forms a touch surface. The first hard coat desirably exhibits good abrasion resistance, and maintains surface characteristics such as finger slidability even after repeated wipes with a handkerchief or the like.

The first hard coat is formed of a coating material containing no inorganic particles. The first hard coat is preferably formed of a coating material including (A) 100 parts by mass of a polyfunctional (meth)acrylate and (B) 0.01 to 7 parts by mass of a water repellent agent, and containing no inorganic particles. The first hard coat is more preferably formed of a coating material including (A) 100 parts by mass of the polyfunctional (meth)acrylate, (B) 0.01 to 7 parts by mass of the water repellent agent, and (C) 0.01 to 10 parts by mass of a silane coupling agent, and containing no inorganic particles.

The inorganic particles (for example, silica (silicon dioxide); metal oxide particles formed of aluminum oxide, zirconia, titania, zinc oxide, germanium oxide, indium oxide, tin oxide, indium tin oxide, antimony oxide, cerium oxide, or the like; metal fluoride particles formed of magnesium fluoride, sodium fluoride, or the like; metal sulfide particles; metal nitride particles; and metal particles) are highly effective in enhancing hardness of a hard coat. On the other hand, an interaction between the inorganic particles and a resin component such as the polyfunctional (meth) acrylate of component (A) is weak, resulting in insufficient abrasion resistance. Therefore, the present invention has solved this problem by (1) allowing the first hard coat usually constituting an outermost surface to contain no inorganic particles for retaining abrasion resistance, and allowing the second hard coat to preferably contain a specific amount of inorganic particles having an average particle diameter of 1 to 300 nm for enhancing hardness, or by (2) using a resin film including (α) at least one layer of the acrylic resin including 50 to 95% by mole of a structural unit derived from methyl methacrylate and 50 to 5% by mole of a structural unit derived from vinylcyclohexane relative to 100% by mole of the total amount of structural units derived from a polymerizable monomer.

Here, "containing no" inorganic particles means not containing a significant amount of inorganic particles. In the field of a hard coat forming coating material, the significant amount of inorganic particles is usually about 1 part by mass or more relative to 100 parts by mass of component (A). Therefore, "containing no" inorganic particles can be paraphrased as follows. That is, the amount of inorganic particles is usually 0 parts by mass or more, usually less than 1 part by mass, preferably 0.1 part by mass or less, and more preferably 0.01 part by mass or less relative to 100 parts by mass of component (A).

(A) Polyfunctional (Meth)Acrylate

The polyfunctional (meth)acrylate of component (A) is a (meth)acrylate having two or more (meth)acryloyl groups in one molecule. This component has two or more (meth) acryloyl groups in one molecule, and therefore serves to form a hard coat through polymerization and curing with an active energy ray such as an ultraviolet ray or an electron beam. It should be noted that a (meth)acryloyl group herein means an acryloyl group or a methacryloyl group.

Examples of the polyfunctional (meth)acrylate include a (meth)acryloyl group-containing bifunctional reactive monomer such as diethylene glycol di(meth)acrylate, neopentyl glycol di(meth)acrylate, 1,6-hexanediol di(meth) acrylate, polyethylene glycol di(meth)acrylate, 2,2'-bis(4-(meth)acryloyloxypolyethyleneoxyphenyl) propane, or 2,2'-bis(4-(meth)acryloyloxypolypropyleneoxyphenyl) propane; a (meth)acryloyl group-containing trifunctional reactive monomer such as trimethylolpropane tri(meth)acrylate, trimethylolethane tri(meth)acrylate, or pentaerythritol tri (meth)acrylate; a (meth)acryloyl group-containing tetrafunctional reactive monomer such as pentaerythritol tetra (meth)acrylate; a (meth)acryloyl group-containing hexafunctional reactive monomer such as dipentaerythritol hexaacrylate; a (meth)acryloyl group-containing octafunctional reactive monomer such as tripentaerythritol acrylate; and a polymer (oligomer or prepolymer) containing one or more kinds thereof as constituent monomers. As the polyfunctional (meth)acrylate of component (A), these compounds can be used singly or in a mixture of two or more kinds thereof. It should be note that a (meth)acrylate herein means an acrylate or a methacrylate.

(B) Water Repellent Agent

The water repellent agent of component (B) serves to enhance finger slidability, resistance to fouling deposition, and wipeability against fouling.

Examples of the water repellent agent include a wax water repellent agent such as a paraffin wax, a polyethylene wax, or an acrylate-ethylene copolymer wax; a silicone water repellent agent such as a silicone oil, a silicone resin, a polydimethylsiloxane, or an alkylalkoxysilane; and a fluorine-containing water repellent agent such as a fluoropolyether water repellent agent or a fluoropolyalkyl water repellent agent. As the water repellent agent of component (B), these compounds can be used singly or in a mixture of two or more kinds thereof.

Among these compounds, a fluoropolyether water repellent agent is preferable as the water repellent agent of component (B) from a viewpoint of water repellency. A water repellent agent including a compound having a (meth) acryloyl group and a fluoropolyether group in a molecule (hereinafter, abbreviated as a (meth)acryloyl group-containing fluoropolyether water repellent agent) is more preferable as the water repellent agent of component (B) from a viewpoint of preventing a trouble such as bleed-out of component (B) because of a chemical bond or a strong interaction between the polyfunctional (meth)acrylate of component (A) and component (B). An admixture of an acryloyl group-containing fluoropolyether water repellent agent and a methacryloyl group-containing fluoropolyether water repellent agent is still more preferable as the water repellent agent of component (B) from a viewpoint of appropriately controlling a chemical bond or an interaction between the polyfunctional (meth)acrylate of component (A) and the water repellent agent of component (B) to exhibit good water repellency while keeping high transparency.

The (meth)acryloyl group-containing fluoropolyether water repellent agent is clearly distinguished from component (A) by the presence or absence of a fluoropolyether group in a molecule. Here, a compound having two or more (meth)acryloyl groups and a fluoropolyether group in one molecule is a (meth)acryloyl group-containing fluoropolyether water repellent agent, which is component (B). That is, a compound having a fluoropolyether group is excluded from definition of the polyfunctional (meth)acrylate of component (A).

The blending amount of the water repellent agent of component (B) is usually 7 parts by mass or less, preferably 4 parts by mass or less, and more preferably 2 parts by mass or less relative to 100 parts by mass of the polyfunctional (meth)acrylate of component (A) from a viewpoint of preventing a trouble such as bleed-out of component (B). At the same time, the blending amount of the water repellent agent of component (B) is usually 0.01 part by mass or more, preferably 0.05 parts by mass or more, and more preferably 0.1 part by mass or more from a viewpoint of obtaining an effect of use of the water repellent agent of component (B). The blending amount of the water repellent agent may be usually 0.01 part by mass or more and 7 parts by mass or less, preferably 0.01 part by mass or more and 4 parts by mass or less or 0.01 part by mass or more and 2 parts by mass or less, preferably 0.05 parts by mass or more and 7 parts by mass or less, 0.05 parts by mass or more and 4 parts by mass or less, or 0.05 parts by mass or more and 2 parts by mass or less, or preferably 0.1 part by mass or more and 7 parts by mass or less, 0.1 part by mass or more and 4 parts by mass or less, or 0.1 part by mass or more and 2 parts by mass or less.

(C) Silane Coupling Agent

Component (C) serves to enhance adhesiveness between the first hard coat and another layer, for example, adhesiveness between the first hard coat and the second hard coat.

The silane coupling agent is a silane compound having at least two kinds of different reactive groups selected from a hydrolyzable group (for example, an alkoxy group such as a methoxy group or an ethoxy group; an acyloxy group such as an acetoxy group; or a halogen group such as a chloro group) and an organic functional group (for example, an amino group, a mercapto group, a vinyl group, an epoxy group, a methacryloxy group, an acryloxy group, or an isocyanate group). Among these compounds, a silane coupling agent having an amino group (i.e., a silane compound having an amino group and a hydrolyzable group) and a silane coupling agent having a mercapto group (i.e., a silane compound having a mercapto group and a hydrolyzable group) are preferable as the silane coupling agent of component (C) from a viewpoint of adhesiveness. A silane coupling agent having an amino group is more preferable from a viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene) propylamine, N-phenyl-3-aminopropyltrimethoxysilane, and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

As the silane coupling agent of component (C), these compounds can be used singly or in a mixture of two or more kinds thereof.

The blending amount of the silane coupling agent of component (C) is usually 0.01 part by mass or more, preferably 0.05 parts by mass or more, and more preferably 0.1 part by mass or more relative to 100 parts by mass of the polyfunctional (meth)acrylate of component (A) from a viewpoint of obtaining an adhesiveness-enhancing effect reliably. At the same time, the blending amount of the silane coupling agent of component (C) may be usually 10 parts by mass or less, preferably 5 parts by mass or less, and more preferably 1 part by mass or less from a viewpoint of a pot life of a coating material. The blending amount of the silane coupling agent may be usually 0.01 part by mass or more and 10 parts by mass or less, preferably 0.01 part by mass or more and 5 parts by mass or less, or 0.01 part by mass or more and 1 part by mass or less, or preferably 0.05 parts by mass or more and 10 parts by mass or less, 0.05 parts by mass or more and 5 parts by mass or less, or 0.05 parts by mass or more and 1 part by mass or less, or preferably 0.1 part by mass or more and 10 parts by mass or less, 0.1 part by mass or more and 5 parts by mass or less, or 0.1 part by mass or more and 1 part by mass or less.

It should be noted that the blending amount of the silane coupling agent of component (C) in any usual or preferable range referred to herein can be combined with the blending amount of the water repellent agent of component (B) in any usual or preferable range referred to above.

(F) Resin Fine Particles Having an Average Particle Diameter of 0.5 to 10 µm

When an antiglare property is imparted to the hard coat laminated film according to at least one embodiment, the first hard coat forming coating material can further includeinclude (F) resin fine particles having an average particle diameter of 0.5 to 10 µm. The resin fine particles of component (F) can strongly interact with a resin component such as the polyfunctional (meth)acrylate of component (A).

The resin fine particles used as the above component (F) are not particularly limited as long as having the above range of average particle diameter and not being dissolved in a solvent of a coating material for the purpose of blending the resin fine particles in a coating material and imparting an antiglare property. Examples of the resin fine particles include resin fine particles of a silicon-based resin (silicone resin), a styrene resin, an acrylic resin, a fluorine resin, a polycarbonate resin, an ethylene resin, and a cured resin of an amino compound and formaldehyde. Among these compounds, fine particles of a silicon-based resin, an acrylic resin, and a fluorine resin are preferable from viewpoints of low specific gravity, lubricity, dispersibility, and solvent resistance. Truly spherical fine particles are preferable from a viewpoint of improving light diffusibility. As the resin fine particles of component (F), these compounds can be used singly or in a mixture of two or more kinds thereof. The resin fine particles may be at least one selected from the group consisting of silicon-based resin, acrylic resin, and fluorine resin fine particles. In addition, the resin fine particles may be at least one selected from the group consisting of silicon-based resin and acrylic resin fine particles.

The average particle diameter of component (F) may be usually 0.5 µm or more, and preferably 1 µm or more from a viewpoint of reliably obtaining an antiglare property. On the other hand, when it is intended to retain transparency of a hard coat, the average particle diameter of component (F) may be usually 10 µm or less, and preferably 6 µm or less. The average particle diameter of the resin fine particles of component (F) may be usually 0.5 µm or more and 10 µm or less, and preferably 0.5 µm or more and 6 µm or less, 1 µm or more and 10 µm or less, or 1 µm or more and 6 µm or less.

Incidentally, here, the average particle diameter of resin fine particles is a particle diameter at which cumulation from a smaller side of the particle diameter becomes 50% by mass in a particle diameter distribution curve measured using a laser diffraction/scattering particle size analyzer "MT3200II" (trade name) available from Nikkiso Co., Ltd.

The resin fine particles of component (F) are preferably spherical, and more preferably truly spherical from a viewpoint of improving light diffusibility. The fact that the resin fine particles of component (F) are truly spherical means that the sphericity of the particles may be preferably 0.90 or more, and more preferably 0.95 or more. The sphericity is a measure for indicating how spherical a particle is. The sphericity referred to herein is obtained by dividing a surface area of a sphere having the same volume as a particle by a surface area of the particle, and can be represented by $\psi = (6 V_p)^{2/3} \pi^{1/3}/A_p$. Here, $V_p$ represents a particle volume, and $A_p$ represents a particle surface area. The sphericity is 1 for a spherical particle.

The blending amount of the resin fine particles of component (F) may be usually from 0.01 to 15 parts by mass, preferably from 0.1 to 10 parts by mass, more preferably from 0.2 to 5 parts by mass, and still more preferably from 0.3 to 3 parts by mass relative to 100 parts by mass of the polyfunctional (meth)acrylate of component (A), although depending on the level of an antiglare property to be imparted. The blending amount of the resin fine particles of component (F) may be preferably from 0.5 to 3 parts by mass from a viewpoint of abrasion resistance. According to at least one embodiment, the blending amount of the resin fine particles of component (F) may be preferably from 0.01 to 10 parts by mass, from 0.01 to 5 parts by mass, from 0.01 to 3 parts by mass, from 0.1 to 15 parts by mass, from 0.1 to 5 parts by mass, from 0.1 to 3 parts by mass, from 0.2 to 15 parts by mass, from 0.2 to 10 parts by mass, from 0.2 to 3 parts by mass, from 0.3 to 15 parts by mass, from 0.3 to 10 parts by mass, from 0.3 to 5 parts by mass, from 0.5 to 15 parts by mass, from 0.5 to 10 parts by mass, or from 0.5 to 5 parts by mass relative to 100 parts by mass of component (A).

The first hard coat forming coating material preferably further include a compound having two or more isocyanate groups (—N═C═O) in one molecule and/or a photopolymerization initiator from a viewpoint of improving curability with an active energy ray.

Examples of the compound having two or more isocyanate groups in one molecule include methylenebis-4-cyclohexylisocyanate; a polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, or a biuret form of hexamethylene diisocyanate; and a urethane crosslinking agent such as blocked isocyanates of the polyisocyanates. As the compound having two or more isocyanate groups in one molecule, these compounds can be used singly or in a mixture of two or more kinds thereof. In crosslinking, a catalyst such as dibutyltin dilaurate or dibutyltin diethylhexoate may be added as necessary.

Examples of the photopolymerization initiator include a benzophenone compound such as benzophenone, methyl-o-benzoyl benzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, or 2,4,6-trimethylbenzophenone; a benzoin compound such as benzoin, benzoin methyl ether, benzoin ethyl ether, benzoin isopropyl ether, or benzyl methyl ketal; an acetophenone compound such as acetophenone, 2,2-dimethoxy-2-phenylacetophenone, or 1-hydroxycyclohexyl phenyl ketone; an anthraquinone compound such as methylanthraquinone, 2-ethylanthraquinone, or 2-amylanthraquinone; a thioxanthone compound such as thioxanthone, 2,4-diethylthioxanthone, or 2,4-diisopropylthioxanthone; an alkylphenone compound such as acetophenone dimethyl ketal; a triazine compound; a biimidazole compound; an acylphosphine oxide compound; a titanocene compound; an oxime ester compound; an oxime phenylacetate compound; a hydroxyketone compound; and an aminobenzoate compound. As the photopolymerization initiator, these compounds can be used singly or in a mixture of two or more kinds thereof.

The first hard coat forming coating material can include one or more additives such as an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, and an organic colorant, as desired.

The first hard coat forming coating material may include a solvent as desired for dilution to a concentration which allows easy application. The solvent is not particularly limited as long as the solvent neither reacts with components (A) to (C) or other optional components nor catalyzes (promotes) a self-reaction (including a degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. As the solvent, these compounds can be used singly or in a mixture of two or more kinds thereof.

The first hard coat forming coating material can be obtained by mixing and stirring these components.

A method for forming the first hard coat using the first hard coat forming coating material is not particularly limited, but a known web applying method can be used. Examples of the web applying method include roll coating, gravure coating, reverse coating, roll brushing, dip coating, spray coating, spin coating, air knife coating, and die coating.

The thickness of the first hard coat is not particularly limited, but may be usually 1 µm or more, preferably 5 µm or more, more preferably 10 µm or more, and still more preferably 15 µm or more from a viewpoint of surface hardness. In addition, the thickness of the first hard coat may be preferably 100 µm or less, and more preferably 50 µm or less from a viewpoint of cutting processability or a web handling property of the hard coat laminated film according to at least one embodiment. The thickness of the first hard coat may be preferably 5 µm or more and 100 µm or less, 5 µm or more and 50 µm or less, 10 µm or more and 100 µm or less, 10 µm or more and 50 µm or less, 15 µm or more and 100 µm or less, or 15 µm or more and 50 µm or less.

According to at least one embodiment of forming the second hard coat, the thickness of the first hard coat may be preferably 0.5 μm or more, and more preferably 1 μm or more from a viewpoint of abrasion resistance and hardness. At the same time, the thickness of the first hard coat may be preferably 5 μm or less, more preferably 4 μm or less, and still more preferably 3 μm or less from a viewpoint of hardness and adhesiveness to the second hard coat. According to at least one embodiment of forming the second hard coat, the thickness of the first hard coat may be preferably 0.5 μm or more and 5 μm or less, 0.5 μm or more and 4 μm or less, 0.5 μm or more 3 μm or less, 1 μm or more and 5 μm or less, 1 μm or more and 4 μm or less, or 1 μm or more and 3 μm or less.

Second Hard Coat

The second hard coat is formed of a coating material containing inorganic particles. The second hard coat is preferably formed of a coating material including (A) 100 parts by mass of a polyfunctional (meth)acrylate and (D) 50 to 300 parts by mass of inorganic fine particles having an average particle diameter of 1 to 300 nm.

As the (A) polyfunctional (meth)acrylate for the second hard coat, the same compounds as those described above for the first hard coat forming coating material can be used. As the polyfunctional (meth)acrylate of component (A), these compounds can be used singly or in a mixture of two or more kinds thereof.

(D) Inorganic Fine Particles Having an Average Particle Diameter of 1 to 300 nm

The inorganic fine particles of component (D) dramatically serve to enhance surface hardness of the hard coat laminated film according to at least one embodiment.

Examples of the inorganic fine particles include silica (silicon dioxide); metal oxide fine particles formed of aluminum oxide, zirconia, titania, zinc oxide, germanium oxide, indium oxide, tin oxide, indium tin oxide, antimony oxide, cerium oxide, or the like; metal fluoride fine particles formed of magnesium fluoride, sodium fluoride, or the like; metal sulfide fine particles; metal nitride fine particles; and metal fine particles.

Among these compounds, fine particles formed of silica or aluminum oxide are preferable, and fine particles formed of silica are more preferable in order to obtain a hard coat having a higher surface hardness. Examples of commercially available silica fine particles include Snowtex (trade name) available from Nissan Chemical Industries, Ltd. and Quartron (trade name) available from Fuso Chemical Co., Ltd.

In order to enhance dispersibility of inorganic fine particles in a coating material or enhance surface hardness of a hard coat obtained, it is preferable to use inorganic fine particles which have been subjected to a surface treatment with a silane coupling agent such as a vinylsilane or an aminosilane; a titanate coupling agent; an aluminate coupling agent; an organic compound having a reactive functional group such as an ethylenically unsaturated bond group such as a (meth)acryloyl group, a vinyl group, or an allyl group, or an epoxy group; a surface-treatment agent such as a fatty acid or a fatty acid metal salt; or the like. Such inorganic fine particles which have been subjected to a surface-treatment also include an inorganic substance as a nucleus, and therefore fall within a category of "inorganic particles" which are defined as those not being included in the first hard coat forming coating material.

As the inorganic fine particles of component (D), these compounds can be used singly or in a mixture of two or more kinds thereof.

The average particle diameter of the inorganic fine particles of component (D) is usually 300 nm or less, preferably 200 nm or less, and more preferably 120 nm or less from a viewpoint of obtaining a hardness-improving effect of a hard coat reliably. On the other hand, the lower limit of the average particle diameter is not particularly specified, but the average particle diameter of inorganic fine particles usually available is about 1 nm at the finest.

Incidentally, here, the average particle diameter of the inorganic fine particles is a particle diameter at which cumulation from a smaller side of the particle diameter becomes 50% by mass in a particle diameter distribution curve measured using a laser diffraction/scattering particle size analyzer "MT3200II" (trade name) available from Nikkiso Co., Ltd.

The blending amount of the inorganic fine particles of component (D) is usually 50 parts by mass or more, and preferably 80 parts by mass or more relative to 100 parts by mass of the polyfunctional (meth)acrylate of component (A) from a viewpoint of surface hardness. At the same time, the blending amount of the inorganic fine particles of component (D) may be usually 300 parts by mass or less, preferably 200 parts by mass or less, and more preferably 160 part by mass or less from a viewpoint of transparency. The blending amount of the inorganic fine particles may be usually 50 parts by mass or more and 300 parts by mass or less, preferably 50 parts by mass or more and 200 parts by mass or less, or 50 parts by mass or more and 160 parts by mass or less, or preferably 80 parts by mass or more and 300 parts by mass or less, 80 parts by mass or more and 200 parts by mass or less, or 80 parts by mass or more and 160 parts by mass or less relative to 100 parts by mass of the polyfunctional (meth)acrylate of component (A).

(E) Leveling Agent

The second hard coat forming coating material preferably further include (E) a leveling agent from a viewpoint of smoothing the second hard coat surface to form the first hard coat easily.

Examples of the leveling agent of component (E) include an acrylic leveling agent, a silicone leveling agent, a fluorine leveling agent, a silicone-acrylate copolymer leveling agent, a fluorine-modified acrylic leveling agent, a fluorine-modified silicone leveling agent, and a leveling agent into which a functional group (for example, an alkoxy group such as a methoxy group or an ethoxy group, an acyloxy group, a halogen group, an amino group, a vinyl group, an epoxy group, a methacryloxy group, an acryloxy group, or an isocyanate group) is introduced. Among these compounds, a silicone-acrylate copolymer leveling agent is preferable as the leveling agent of component (E). As the leveling agent of component (E), these compounds can be used singly or in a mixture of two or more kinds thereof.

The blending amount of the leveling agent of component (E) is usually 0.01 part by mass or more, preferably 0.1 part by mass or more, and more preferably 0.2 parts by mass or more relative to 100 parts by mass of the polyfunctional (meth)acrylate of component (A) from a viewpoint of smoothing the second hard coat surface to form the first hard coat easily. At the same time, this blending amount may be usually 1 part by mass or less, preferably 0.6 parts by mass or less, and more preferably 0.4 parts by mass or less from a viewpoint of satisfactorily applying the first hard coat forming coating material on the second hard coat without being repelled. The blending amount of the leveling agent of component (E) may be usually 0.01 part by mass or more and 1 part by mass or less, preferably 0.01 part by mass or more and 0.6 parts by mass or less, or 0.01 part by mass or more and 0.4 parts by mass or less, preferably 0.1 part by mass or more and 1 part by mass or less, 0.1 part by mass or more and 0.6 parts by mass or less, or 0.1 part by mass or more and 0.4 parts by mass or less, or preferably 0.2 parts by mass or more and 1 part by mass or less, 0.2 parts by mass or more and 0.6 parts by mass or less, or 0.2 parts by mass or more and 0.4 parts by mass or less relative to 100 parts by mass of the polyfunctional (meth)acrylate of component (A).

It should be noted that the blending amount of the leveling agent of component (E) in any usual or preferable range referred to herein can be combined with the blending amount of the inorganic fine particles of component (D) in any usual or preferable range referred to above.

The second hard coat forming coating material preferably further includes a compound having two or more isocyanate groups (—N=C=O) in one molecule and/or a photopolymerization initiator from a viewpoint of improving curability with an active energy ray.

As the compound having two or more isocyanate groups in one molecule for the second hard coat, the same compounds as those described above for the first hard coat forming coating material can be used. As the compound having two or more isocyanate groups in one molecule, these compounds can be used singly or in a mixture of two or more kinds thereof.

As the photopolymerization initiator for the second hard coat, the same compounds as those described above for the first hard coat forming coating material can be used. As the photopolymerization initiator, these compounds can be used singly or in a mixture of two or more kinds thereof.

The second hard coat forming coating material can include one or two or more additives such as an antistatic agent, a surfactant, a thixotropy-imparting agent, an antifouling agent, a printability improver, an antioxidant, a weather resistance stabilizer, a light resistance stabilizer, an ultraviolet absorber, a heat stabilizer, a colorant, and organic fine particles, as desired.

The second hard coat forming coating material may include a solvent as desired for dilution to a concentration which allows easy application. The solvent is not particularly limited as long as the solvent neither reacts with component (A) or (D) or other optional components nor catalyzes (promotes) a self-reaction (including degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. Among these compounds, 1-methoxy-2-propanol is preferable. As the solvent, these compounds can be used singly or in a mixture of two or more kinds thereof.

The second hard coat forming coating material can be obtained by mixing and stirring these components.

A method for forming the second hard coat using the second hard coat forming coating material is not particularly limited, but a known web applying method can be used. Examples of the web applying method include roll coating, gravure coating, reverse coating, roll brushing, dip coating, spray coating, spin coating, air knife coating, and die coating.

The thickness of the second hard coat may be usually 5 µm or more, preferably 10 µm or more, more preferably 15 µm or more, and still more preferably 18 µm or more from a viewpoint of surface hardness. At the same time, the thickness of the second hard coat may be preferably 30 µm or less, more preferably 27 µm or less, and still more preferably 25 µm or less from a viewpoint of impact resistance.

The thickness of the second hard coat may be preferably 5 µm or more and 30 µm or less, and more preferably 5 µm or more and 27 µm or less, 5 µm or more and 25 µm or less, 10 µm or more and 30 µm or less, 10 µm or more and 27 µm or less, 10 µm or more and 25 µm or less, 15 µm or more and 30 µm or less, 15 µm or more and 27 µm or less, 15 µm or more and 25 µm or less, 18 µm or more and 30 µm or less, 18 µm or more and 27 µm or less, or 18 µm or more and 25 µm or less.

It should be noted that the thickness of the second hard coat in any preferable range referred to herein can be combined with the thickness of the first hard coat in any preferable range referred to above.

Resin Film

According to at least one embodiment, the resin film can act as a film substrate for forming the first hard coat thereon. According to at least one embodiment, the resin film can act as a film substrate for forming the first hard coat and the second hard coat thereon. The resin film includes (α) at least one layer of an acrylic resin including a structural unit derived from methyl methacrylate (hereinafter, also abbreviated as MMA) in an amount of 50 to 95% by mole, preferably 65 to 90% by mole, more preferably 70 to 85% by mole, and a structural unit derived from vinylcyclohexane (hereinafter, also abbreviated as VCH) in an amount of 50 to 5% by mole, preferably 35 to 10% by mole, more preferably 30 to 15% by mole relative to 100% by mole of the total amount of structural units derived from a polymerizable monomer. Here, the sum of the MMA content and the VCH content may be usually 80% by mole or more, preferably 90% by mole or more, more preferably 95% by mole or more, and still more preferably 99% by mole or more and 100% by mole or less relative to 100% by mole of the total amount of structural units derived from a polymerizable monomer in the acrylic resin. The term "polymerizable monomer" referred to herein generally means a monomer capable of initiating polymerization with use of an external factor such as heat, radiation, pressure, a radical, or a catalyst as a trigger to form a resin. The polymerizable monomer usually refers to a group of compounds each having a carbon-carbon unsaturated bond, and typical examples thereof include a compound having an ethylenic double bond.

Figure 2:
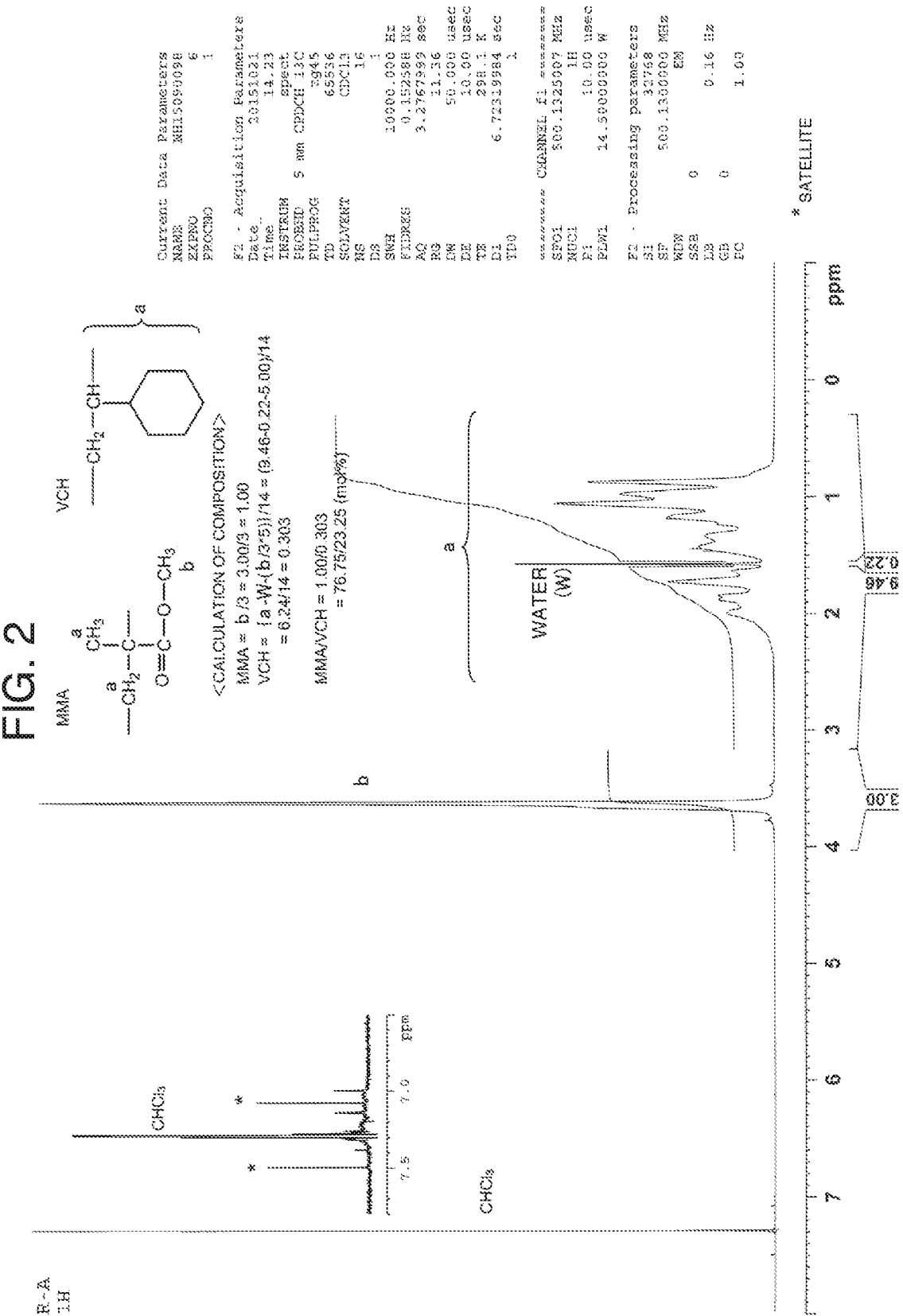
FIG. 2 is an example of a $^1$H-NMR spectrum of the acrylic resin (α).

The content of each structural unit such as the content of MMA or the content of VCH in the (α) acrylic resin can be determined using $^1$H-NMR or $^{13}$C-NMR. For example, the $^1$H-NMR spectrum can be measured under the following conditions using a 500 MHz nuclear magnetic resonance apparatus by dissolving 15 mg of a sample in 0.6 mL of a chloroform-$d_1$ solvent. FIG. 2 illustrates a measurement example.

Chemical shift reference: Automatic setting by apparatus
Measurement mode: Single pulse
Pulse width: 45° (5.0 µs)
Number of points: 32 K
Measurement range: 15 ppm (−2.5 to 12.5 ppm)
Repetition time: 10.0 seconds
Number of integrations: 16
Measurement temperature: 25° C.
Window function: exponential (BF: 0.16 Hz)

Figure 3:
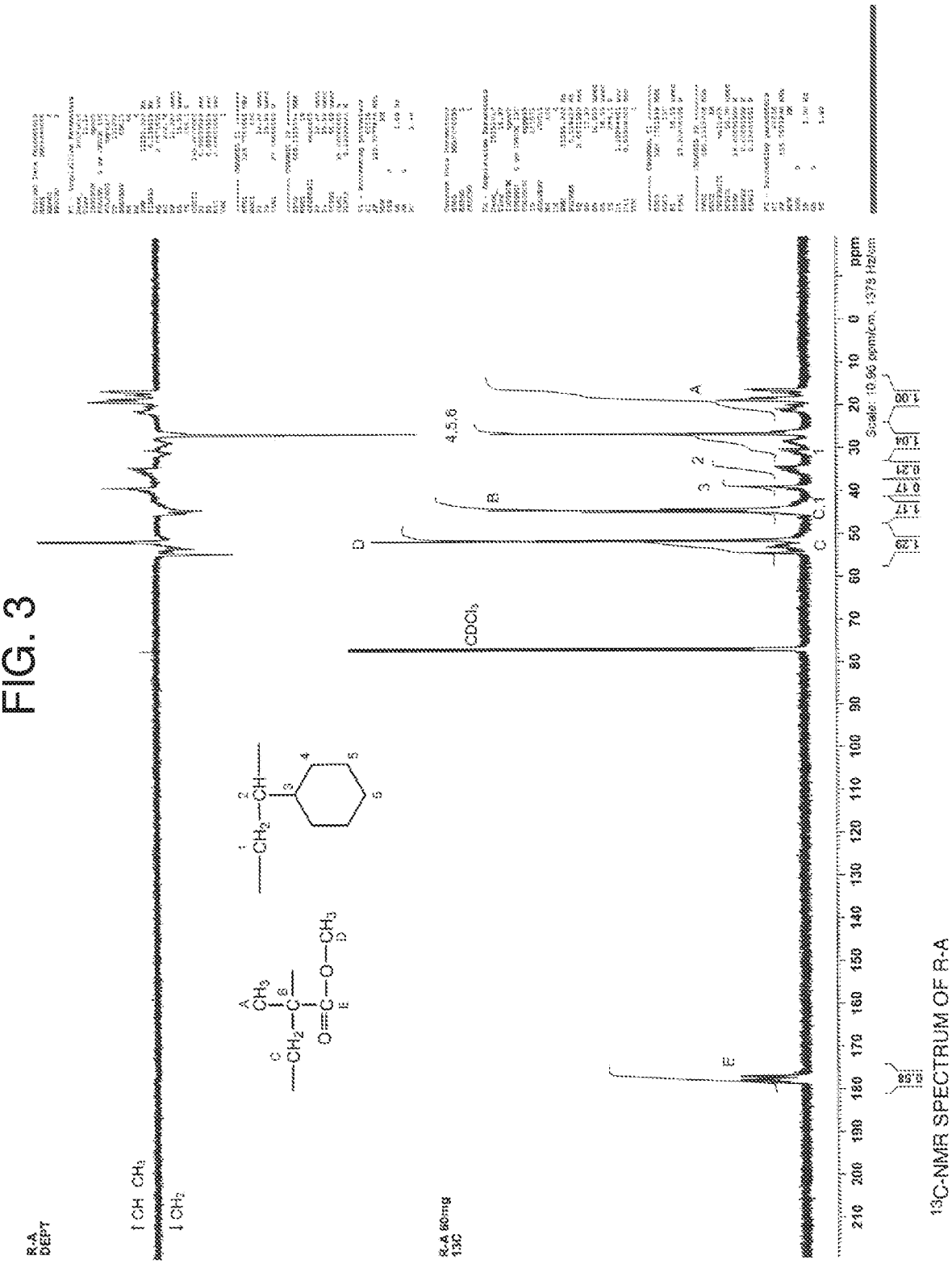
FIG. 3 is an example of a $^{13}$C-NMR spectrum of the acrylic resin (α).

For example, the $^{13}$C-NMR spectrum can be measured under the following conditions using a 125 MHz nuclear magnetic resonance apparatus by dissolving 60 mg of a sample in 0.6 mL of a chloroform-$d_1$ solvent. FIG. 3 illustrates a measurement example.

Chemical shift reference: Automatic setting by apparatus

Measurement mode: Single pulse proton broadband decoupling

Pulse width: 45° (5.0 μs)

Number of points: 64 K

Measurement range: 250 ppm (−25 to 225 ppm)

Repetition time: 5.5 seconds

Number of integrations: 128

Measurement temperature: 25° C.

Window function: exponential (BF: 1.00 Hz)

Peak attribution is performed with reference to "Polymer Analysis Handbook (First edition and first printing on Sep. 20, 2008, edited by Symposium on Polymer Analysis of The Japan Society for Analytical Chemistry, Asakura Shoten Co., Ltd.)" or "NMR database (http://polymer.nims go.jp/NMR/) of Materials Information Technology Station of National Institute for Material Science. A ratio of each structural unit in the acrylic resin ($\alpha$) can be calculated from a peak area ratio. In addition, measurement of $^1$H-NMR or $^{13}$C-NMR can be also performed at an analytical institution such as Mitsui Chemical Analysis Center, Inc.

A method for producing the ($\alpha$) acrylic resin is not particularly limited, but a known method can be used.

The ($\alpha$) acrylic resin may be a resin mixture including two or more acrylic resins. In a case of the resin mixture, the content of a structural unit derived from methyl methacrylate and the content of a structural unit derived from vinylcyclohexane in the mixture are only required to be within the above ranges.

The ($\alpha$) acrylic resin can include a core-shell rubber, as desired. By using the core-shell rubber in an amount of usually 0 to 100 parts by mass, preferably 3 to 50 parts by mass, more preferably 5 to 30 parts by mass relative to 100 parts by mass of the ($\alpha$) acrylic resin, cutting processability or impact resistance of a hard coat laminated film can be enhanced. According to at least one embodiment, the blending amount of the core-shell rubber may be from 0 to 50 parts by mass, or from 0 to 30 parts by mass, and preferably from 3 to 100 parts by mass, from 3 to 30 parts by mass, from 5 to 100 parts by mass, or from 5 to 50 parts by mass relative to 100 parts by mass of the ($\alpha$) acrylic resin.

Examples of the core-shell rubber include core-shell rubbers each formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, or a methacrylate-acrylonitrile/acrylate rubber graft copolymer. As the core-shell rubber, these compounds can be used singly or in a mixture of two or more kinds thereof.

The ($\alpha$) acrylic resin can further include, within a range not contrary to an object according to at least one embodiment, a thermoplastic resin other than the ($\alpha$) acrylic resin and the core-shell rubber; a pigment, an inorganic filler, an organic filler, and a resin filler; an additive such as a lubricant, an antioxidant, a weather resistance stabilizer, a heat stabilizer, a release agent, an antistatic agent, or a surfactant; or the like, as desired. The blending amount of the optional component(s) may be usually about from 0.01 to 10 parts by mass relative to 100 parts by mass of the ($\alpha$) acrylic resin.

The thickness of the resin film (monolayer or multilayer) is not particularly limited, but can be any thickness as desired. The thickness of the resin film may be usually 20 μm or more, and preferably 60 μm or more from a viewpoint of handleability of the hard coat laminated film according to at least one embodiment. When the hard coat laminated film according to at least one embodiment is used for an application not requiring high rigidity, the thickness of the resin film may be usually 250 μm or less, and preferably 150 μm or less from a viewpoint of economic efficiency. Therefore, in such an application, the thickness of the resin film may be preferably 20 μm or more and 250 μm or less, 20 μm or more and 150 μm or less, 60 μm or more and 250 μm or less, or 60 μm or more and 150 μm or less.

When the hard coat laminated film according to at least one embodiment is used for an application requiring high rigidity, such as a display face plate, the thickness of the resin film may be usually 100 μm or more, preferably 200 μm or more, and more preferably 300 μm or more. In addition, the thickness of the resin film may be usually 1500 μm or less, preferably 1200 μm or less, and more preferably 1000 μm or less from a viewpoint of meeting a requirement for a thinner apparatus. Therefore, in such an application, the thickness of the resin film may be preferably 100 μm or more and 1500 μm or less, 100 μm or more and 1200 μm or less, 100 μm or more and 1000 μm or less, 200 μm or more and 1500 μm or less, 200 μm or more and 1200 μm or less, 200 μm or more and 1000 μm or less, 300 μm or more and 1500 μm or less, 300 μm or more and 1200 μm or less, or 300 μm or more and 1000 μm or less.

Note that the thickness of the resin film in any preferable range referred to herein can be combined with the thickness(es) of the first hard coat and/or the second hard coat in any preferable range referred to above.

According to at least one embodiment, the resin film may be a monolayer film of the ($\alpha$) acrylic resin. In a case of a monolayer film, the thickness of the resin film follows the above description.

According to at least one embodiment, the resin film may be a multilayer resin film obtained by sequentially laminating ($\alpha$) a layer of the acrylic resin, ($\beta$) a layer of an aromatic polycarbonate resin, and ($\alpha$) a layer of the acrylic resin, directly in this order.

The ($\alpha$) acrylic resin has excellent surface hardness, but tends to have insufficient cutting processability. Meanwhile, the aromatic polycarbonate resin has excellent cutting processability, but tends to have insufficient surface hardness. Therefore, use of a multilayer resin film having the above layer configuration makes it possible to easily obtain a hard coat laminated film having excellent surface hardness and excellent cutting processability by compensating for drawbacks of the two resins.

According to at least one embodiment, the resin film may be a multilayer resin film obtained by sequentially laminating ($\alpha$) a layer of the acrylic resin, ($\gamma$) a layer of a resin composition including the ($\alpha$) acrylic resin and a core-shell rubber, and ($\alpha$) a layer of the acrylic resin, directly in this order. Here, the ($\gamma$) resin composition including the ($\alpha$) acrylic resin and a core-shell rubber may include the core-shell rubber in an amount of usually 1 to 100 parts by mass, preferably 3 to 50 parts by mass, more preferably 5 to 30 parts by mass relative to 100 parts by mass of the ($\alpha$) acrylic resin. According to at least one embodiment of this multilayer resin film, the ($\gamma$) resin composition may include the core-shell rubber in an amount of preferably 1 to 50 parts by mass, 1 to 30 parts by mass, 3 to 100 parts by mass, 3 to 30 parts by mass, 5 to 100 parts by mass, or 5 to 50 parts by mass relative to 100 parts by mass of the ($\alpha$) acrylic resin.

The ($\alpha$) acrylic resin has excellent surface hardness, but tends to have insufficient cutting processability. The cutting processability of the ($\alpha$) acrylic resin can be enhanced by blending a core-shell rubber in the ($\alpha$) acrylic resin. On the other hand, by blending a core-shell rubber in the (α) acrylic resin, the (α) acrylic resin tends to have insufficient surface hardness. Therefore, by blending a core-shell rubber only in an intermediate layer without blending a core-shell rubber in both outer layers, a hard coat laminated film having excellent surface hardness and excellent cutting processability can be obtained easily.

Here, the present invention will be described by assuming that (α) a layer of the acrylic resin on a side where the first hard coat is formed is an (α1) layer, and (α) a layer of the acrylic resin on the opposite side is an (α2) layer.

The layer thickness of the (α1) layer is not particularly limited, but may be usually 20 μm or more, preferably 40 μm or more, more preferably 60 μm or more, and still more preferably 80 μm or more from a viewpoint of surface hardness of the hard coat laminated film according to at least one embodiment.

The layer thickness of the (α2) layer is not particularly limited, but is preferably the same layer thickness as the (α1) layer from a viewpoint of curling resistance of the hard coat laminated film according to at least one embodiment.

"The same layer thickness" referred to herein should not be interpreted to be the same layer thickness in a physicochemically strict sense of the word. It should be interpreted to be the same layer thickness within a variation in a process/quality control usually performed industrially. The reason is that curling resistance of a multilayer film can be kept good when the layer thicknesses are the same within a variation in a process/quality control usually performed industrially. An unstretched multilayer film obtained by a T-die co-extrusion method is usually subjected to a process/quality control within a variation of about −5 to +5 μm, and therefore the layer thickness of 65 μm and the layer thickness of 75 μm should be interpreted to be identical. "The same layer thickness" here can be paraphrased as "substantially the same layer thickness".

The layer thickness of the (β) layer is not particularly limited, but may be usually 20 μm or more and preferably 80 μm or more from a viewpoint of cutting processability of the hard coat laminated film according to at least one embodiment.

The layer thickness of the (γ) layer is not particularly limited, but may be usually 20 μm or more, and preferably 80 μm or more from a viewpoint of cutting processability of the hard coat laminated film according to at least one embodiment.

As the (α) acrylic resin for the (α1) layer and the (α2) layer, the resins described above can be used.

For the (α) acrylic resin used for the (α1) layer and the (α) acrylic resin used for the (α2) layer, the (α) acrylic resins having different resin characteristics, for example, having different melt mass flow rates or glass transition temperatures may be used. The (α) acrylic resins having the same resin characteristic are preferably used from a viewpoint of curling resistance of the hard coat laminated film according to at least one embodiment. Use of the (α) acrylic resins in the same grade and in the same lot is one of preferable embodiments, for example.

As the aromatic polycarbonate resin used for the (β) layer, for example, it is possible to use one kind or a mixture of two or more kinds of aromatic polycarbonate resins such as a polymer obtained by an interfacial polymerization method for an aromatic dihydroxy compound such as bisphenol A, dimethyl bisphenol A, or 1,1-bis(4-hydroxyphenyl)-3,3,5-trimethylcyclohexane and phosgene; and a polymer obtained by a transesterification reaction between an aromatic dihydroxy compound such as bisphenol A, dimethyl bisphenol A, or 1,1-bis(4-hydroxyphenyl)-3,3,5-trimethylcyclohexane and a carbonate diester such as diphenyl carbonate.

Preferable examples of optional components which can be contained in the aromatic polycarbonate resin include a core-shell rubber. By using the core-shell rubber in an amount of 0 to 30 parts by mass of (100 to 70 parts by mass of the aromatic polycarbonate resin), preferably in an amount of 0 to 10 parts by mass (100 to 90 parts by mass of the aromatic polycarbonate resin) relative to 100 parts by mass of the total amount of the aromatic polycarbonate resin and the core-shell rubber, cutting processability and impact resistance of the hard coat laminated film can be further enhanced.

Examples of the core-shell rubber include core-shell rubbers each formed of a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, or a methacrylate-acrylonitrile/acrylate rubber graft copolymer. As the core-shell rubber, these compounds can be used singly or in a mixture of two or more kinds thereof.

The aromatic polycarbonate resin can further include, within a range not contrary to an object according to at least one embodiment, a thermoplastic resin other than the aromatic polycarbonate resin and the core-shell rubber; a pigment, an inorganic filler, an organic filler, and a resin filler; an additive such as a lubricant, an antioxidant, a weather resistance stabilizer, a heat stabilizer, a release agent, an antistatic agent, or a surfactant; or the like, as desired. The blending amount of the optional component(s) is usually about from 0.01 to 10 parts by mass relative to 100 parts by mass of the total amount of the aromatic polycarbonate resin and the core-shell rubber.

A method for producing the resin film (including a case where the film is the multilayer resin film) is not particularly limited. As a preferable method for producing the resin film, for example, using an apparatus equipped with an extruder and a T-die, a melted resin film is continuously extruded from the T-die, and the melted resin film is supplied and introduced between a rotating first mirror-finished roll (i.e., a roll to hold the melted film and send the melted film to a subsequent transfer roll, this also applies to the following) and a rotating second mirror-finished roll, and is pressed (see FIG. 4 relevant to Examples).

In forming a hard coat, a hard coat forming surface or both surfaces of the resin film may be subjected to an adhesion-facilitating treatment such as a corona discharge treatment or anchor coating formation in advance in order to enhance adhesion strength to the hard coat.

The hard coat laminated film according to at least one embodiment preferably sequentially includes, from a surface layer side, the first hard coat (or, the first hard coat and the second hard coat), the resin film layer, and a third hard coat. The third hard coat formed allows a force to curl the hard coat laminated film in one direction (hereinafter, also abbreviated as a curling force) and a force to curl the hard coat laminated film in another direction to work simultaneously. By allowing these two curling forces to be canceled to be zero, occurrence of curling can be suppressed. The third hard coat forming coating material and the thickness of the third hard coat are not particularly limited as long as the two curling forces can be canceled. According to at least one embodiment of forming the second hard coat, the third hard coat forming coating material and the thickness of the third hard coat may be those described above for the second hard coat, for example.

The hard coat laminated film according to at least one embodiment may include an optional layer(s) other than the first hard coat, the second hard coat, the resin film layer, and the third hard coat, as desired. Examples of the optional layer include a hard coat other than the first to third hard coats, an anchor coating, a pressure-sensitive adhesive agent layer, a transparent conductive layer, a high refractive index layer, a low refractive index layer, and a reflection-preventive layer.

FIG. 1 is a conceptual cross-sectional view exemplifying the hard coat laminated film according to at least one embodiment. This exemplary hard coat laminated film sequentially includes, from a surface layer side, a first hard coat 1, a second hard coat 2, ($\alpha$1) a layer of the ($\alpha$) acrylic resin 3, ($\beta$) a layer of an aromatic polycarbonate resin 4, ($\alpha$2) a layer of the ($\alpha$) acrylic resin 5, and a third hard coat 6.

The hard coat laminated film according to at least one embodiment has a total light transmittance of preferably 85% or more, more preferably 88% or more, still more preferably 89% or more, most preferably 90% or more (measured with a turbidimeter "NDH 2000" (trade name) available from Nippon Denshoku Industries Co., Ltd. in accordance with JIS K7361-1:1997). Due to the total light transmittance of 85% or more, the hard coat laminated film according to at least one embodiment can be suitably used for a display face plate of an image display apparatus or the like. A higher total light transmittance is more preferable.

In the hard coat laminated film according to at least one embodiment, the first hard coat surface has a pencil hardness of preferably 5 H or more, more preferably 6 H or more, still more preferably 7 H or more (measured with a pencil "UNI" (trade name) available from Mitsubishi Pencil Co., Ltd. under a condition of a load of 750 g in accordance with JIS K5600-5-4). Due to the pencil hardness of 5 H or more, the hard coat laminated film according to at least one embodiment can be suitably used for a display face plate of an image display apparatus or the like. A higher pencil hardness is more preferable.

The hard coat laminated film according to at least one embodiment has a yellowness index of preferably 3 or less, more preferably 2 or less, still more preferably 1 or less (measured with a colorimeter "SolidSpec-3700" (trade name) available from Shimadzu Corporation in accordance with JIS K7105:1981). Due to the yellowness index of 3 or less, the hard coat laminated film according to at least one embodiment can be suitably used for a display face plate of an image display apparatus or the like.

The hard coat laminated film according to at least one embodiment preferably has a total light transmittance of 85% or more and a pencil hardness of 5 H or more on the first hard coat surface, a total light transmittance of 85% or more and a pencil hardness of 6 H or more on the first hard coat surface, a total light transmittance of 85% or more and a pencil hardness of 7 H or more on the first hard coat surface, a total light transmittance of 88% or more and a pencil hardness of 5 H or more on the first hard coat surface, a total light transmittance of 88% or more and a pencil hardness of 6 H or more on the first hard coat surface, a total light transmittance of 88% or more and a pencil hardness of 7 H or more on the first hard coat surface, a total light transmittance of 89% or more and a pencil hardness of 5 H or more on the first hard coat surface, a total light transmittance of 89% or more and a pencil hardness of 6 H or more on the first hard coat surface, a total light transmittance of 89% or more and a pencil hardness of 7 H or more on the first hard coat surface, a total light transmittance of 90% or more and a pencil hardness of 5 H or more on the first hard coat surface, a total light transmittance of 90% or more and a pencil hardness of 6 H or more on the first hard coat surface, or a total light transmittance of 90% or more and a pencil hardness of 7 H or more on the first hard coat surface. In addition, the hard coat laminated film according to at least one embodiment preferably has an yellowness index of 3 or less, 2 or less, or 1 or less relative to each combination group for these preferable ranges of the total light transmittance and the pencil hardness on the first hard coat surface. In addition, each combination group for these preferable ranges of the total light transmittance, the pencil hardness on the first hard coat surface, and the yellowness index can be applied to any one of the first hard coat, the second hard coat, and the resin sheet exemplified above.

In the hard coat laminated film according to at least one embodiment, the water contact angle at the first hard coat surface is preferably 100° or more, and more preferably 105° or more. When the hard coat laminated film according to at least one embodiment is used for a display face plate of a touch panel, the first hard coat usually forms a touch surface. The water contact angle at the first hard coat surface of 100° or more makes it possible to operate a touch panel by sliding a finger or a pen on a touch surface according to one's own will. The upper limit of the water contact angle is not particularly specified, but about 120° is usually sufficient from a viewpoint of sliding a finger or a pen according to one's own will. Here, the water contact angle is a value measured according to a test (iv) in Examples described below.

In the hard coat laminated film according to at least one embodiment, the water contact angle at the first hard coat surface after 20,000 reciprocating wipes with a cotton is 100° or more. More preferably, the water contact angle after 25,000 reciprocating wipes with a cotton is 100° or more. The water contact angle of 100° or more after 20,000 reciprocating wipes with a cotton makes it possible to maintain surface characteristics such as finger slidability even after repeated wipes with a handkerchief or the like. For the number of wipes with a cotton during which a water contact angle of 100° or more can be maintained, a larger number is more preferable. Here, the water contact angle after wipes with a cotton is a value measured according to a test (v) in Examples described below.

In the hard coat laminated film according to at least one embodiment, preferably, the water contact angle at the first hard coat surface is 100° or more, and the water contact angle at the first hard coat surface after 20,000 reciprocating wipes with a cotton is 100° or more. Furthermore, in the hard coat laminated film according to at least one embodiment, preferably, the water contact angle at the first hard coat surface is 105° or more and the water contact angle at the first hard coat surface after 20,000 reciprocating wipes with a cottons is 100° or more, the water contact angle at the first hard coat surface is 100° or more and the water contact angle at the first hard coat surface after 25,000 reciprocating wipes with a cotton is 100° or more, or the water contact angle at the first hard coat surface is 105° or more and the water contact angle at the first hard coat surface after 25,000 reciprocating wipes with a cotton is 100° or more.

In the hard coat laminated film according to at least one embodiment, preferably, the total light transmittance is 85% or more, 88% or more, 89% or more, or 90% or more, the pencil hardness on the first hard coat surface is 5 H or more, 6 H or more, or 7 H or more, the yellowness index is 3 or less, 2 or less, or 1 or less, the water contact angle at the first hard coat surface is 100° or more or 105° or more, and the water contact angle at the first hard coat surface after 20,000 reciprocating wipes with a cotton or after 25,000 reciprocating wipes with a cotton is 100° or more. That is, any combination of the ranges of these five parameters (any "combination" as a mathematical term) is preferable. For example, preferably, the total light transmittance is 88% or more, the pencil hardness on the first hard coat surface is 6 H or more, the yellowness index is 1 or less, the water contact angle at the first hard coat surface is 100° or more, and the water contact angle after 20,000 reciprocating wipes with a cotton is 100° or more. In addition, for example, preferably, the total light transmittance is 89% or more, the pencil hardness on the first hard coat surface is 6 H or more, the yellowness index is 1 or less, the water contact angle at the first hard coat surface is 100° or more, and the water contact angle after 20,000 reciprocating wipes with a cotton is 100° or more.

Producing Method

A method for producing the hard coat laminated film according to at least one embodiment is not particularly limited, but any method can be used. When the hard coat laminated film according to at least one embodiment sequentially includes, from a surface layer side, a first hard coat, a second hard coat, and a resin film layer, a preferable example of producing method, from a viewpoint of adhesiveness between the first hard coat and the second hard coat, includes:

(1) a step of forming a wet coat of the second hard coat forming coating material on the transparent resin film;

(2) a step of irradiating the wet coat of the second hard coat forming coating material with an active energy ray at an integrated amount of light of 1 to 230 $mJ/cm^2$, preferably 5 to 200 $mJ/cm^2$, more preferably 10 to 160 $mJ/cm^2$, still more preferably 20 to 120 $mJ/cm^2$, most preferably 30 to 100 $mJ/cm^2$, and converting the wet coat of the second hard coat forming coating material into a coat in a set-to-touch state;

(3) a step of forming a wet coat of the first hard coat forming coating material on the coat of the second hard coat forming coating material in a set-to-touch state; and (4) a step of preheating the wet coat of the first hard coat forming coating material to a temperature of 30 to 100° C., preferably 40 to 85° C., more preferably 50 to 75° C., and irradiating the wet coat with an active energy ray at an integrated amount of light of 240 to 10000 $mJ/cm^2$, preferably 320 to 5000 $mJ/cm^2$, more preferably 360 to 2000 $mJ/cm^2$, from a viewpoint of adhesiveness between the first hard coat and the second hard coat.

In the step (1), the method for forming the wet coat of the second hard coat forming coating material is not particularly limited, but a known web applying method can be used. Examples of the web applying method include roll coating, gravure coating, reverse coating, roll brushing, dip coating, spray coating, spin coating, air knife coating, and die coating.

The wet coat of the second hard coat forming coating material formed in the step (1) is in a set-to-touch state or in a state with no tackiness in the step (2), causing no problem in handling such as sticking even in direct contact with a web apparatus. Therefore, in the subsequent step (3), a wet coat of the first hard coat forming coating material can be formed on the coat of the second hard coat forming coating material in a set-to-touch state.

It should be noted that the clause "a coat is in a set-to-touch state (in a state with no tackiness)" herein means that a coat is in a state causing no problem in handling even in direct contact with a web apparatus.

Irradiation with an active energy ray in the step (2) is performed such that the integrated amount of light is usually 1 $mJ/cm^2$ or more, preferably 5 $mJ/cm^2$ or more, more preferably 10 $mJ/cm^2$ or more, still more preferably 20 $mJ/cm^2$ or more, and most preferably 30 $mJ/cm^2$ or more from a viewpoint of converting the coat into a coat in a set-to-touch state reliably, although depending on characteristics of the coating material used as the second hard coat forming coating material. At the same time, the irradiation is performed such that the integrated amount of light is usually 230 $mJ/cm^2$ or less, preferably 200 $mJ/cm^2$ or less, more preferably 160 $mJ/cm^2$ or less, still more preferably 120 $mJ/cm^2$ or less, and most preferably 100 $mJ/cm^2$ or less from a viewpoint of adhesiveness between the first hard coat and the second hard coat.

The wet coat of the second hard coat forming coating material is preferably predried before the irradiation with an active energy ray in the step (2). Predrying described above can be performed by allowing a web to pass through a drying furnace set at a temperature of about 23 to 150° C., preferably 50 to 120° C., at a line speed such that the time required to pass from the inlet to the outlet is about from 0.5 to 10 minutes and preferably from 1 to 5 minutes, for example.

When the irradiation with an active energy ray is performed in the step (2), the wet coat of the second hard coat forming coating material may be preheated to a temperature of 40 to 120° C., preferably 70 to 100° C. This can convert the coat into a coat in a set-to-touch state reliably. A method for preheating described above is not particularly limited, but any method can be used. Specific examples of the method will be described below in the description of the step (4).

In the step (3), a method for forming the wet coat of the first hard coat forming coating material is not particularly limited, but a known web applying method can be used. Examples of the web applying method include roll coating, gravure coating, reverse coating, roll brushing, dip coating, spray coating, spin coating, air knife coating, and die coating.

The wet coat of the first hard coat forming coating material formed in the step (3) is completely cured in the step (4). At the same time, the coat of the second hard coat forming coating material is also completely cured.

The above method can enhance adhesiveness between the first hard coat and the second hard coat, and without wishing to be bound by any theory it is presumed that the reason is that complete curing is simultaneously achieved for both the hard coats by limiting the integrated amount of light in irradiation with an active energy ray to an amount adequate to convert the coat into a coat in a set-to-touch state but inadequate to completely cure the coat in the step (2) and setting the integrated amount of light to an amount adequate to completely cure the coat in the step (4) for the first time.

The irradiation with an active energy ray in the step (4) is performed such that the integrated amount of light is 240 $mJ/cm^2$ or more, preferably 320 $mJ/cm^2$ or more, and more preferably 360 $mJ/cm^2$ or more from viewpoints of completely curing the coat and adhesiveness between the first hard coat and the second hard coat. At the same time, the irradiation with an active energy ray is performed such that the integrated amount of light is 10000 $mJ/cm^2$ or less, preferably 5000 $mJ/cm^2$ or less, and more preferably 2000 $mJ/cm^2$ or less from viewpoints of preventing yellowing of a hard coat laminated film obtained and cost.

The wet coat of the first hard coat forming coating material is preferably predried before the irradiation with an active energy ray in the step (4). Predrying described above can be performed by allowing a web to pass through a drying furnace set at a temperature of about 23 to 150° C., preferably 50 to 120° C., at a line speed such that the time required to pass from the inlet to the outlet is about from 0.5 to 10 minutes and preferably from 1 to 5 minutes, for example.

Figure 5:
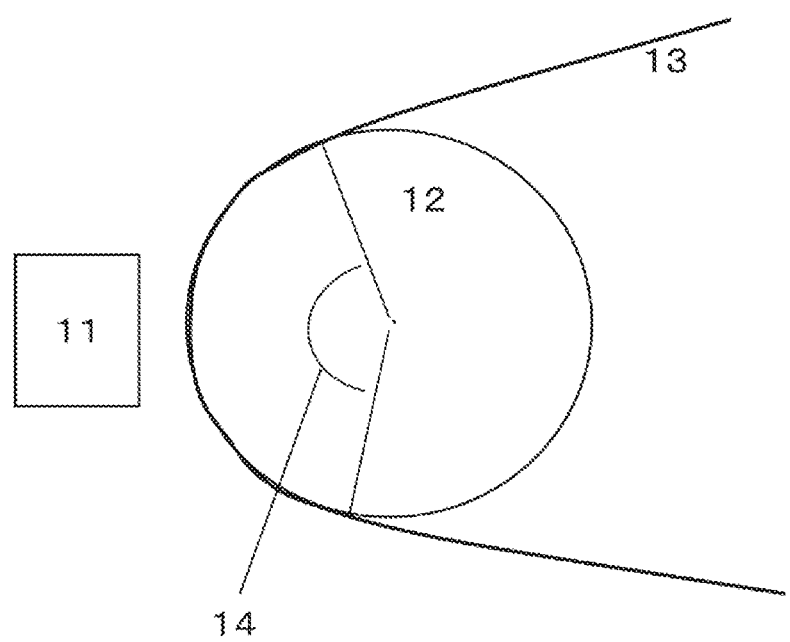
FIG. 5 is a conceptual diagram of an ultraviolet irradiator used in Examples.

When the irradiation with an active energy ray is performed in the step (4), the wet coat of the first hard coat forming coating material is favorably preheated to a temperature of 30 to 100° C., preferably 40 to 85° C., more preferably 50 to 75° C. from a viewpoint of obtaining a good interlayer adhesion strength even when the first hard coat forming coating material and the second hard coat forming coating material have largely different characteristics from each other. A method for preheating described above is not particularly limited, but any method can be used. Examples thereof include a method in which a web 13 is held by a mirror-finished metal roll 12 disposed opposite to an active energy ray (ultraviolet ray) irradiator 11 as illustrated in FIG. 5 and a surface temperature of the roll 12 is controlled to a predetermined temperature; a method in which a temperature in an irradiation furnace surrounding an active energy ray irradiator is controlled to a predetermined temperature; and a combination of these methods.

An aging treatment may be performed after the step (4). The aging treatment can stabilize characteristics of the hard coat laminated film.

Article Including the Hard Coat Laminated Film According to at Least One Embodiment An article including the hard coat laminated film according to at least one embodiment is not particularly limited, but examples thereof include an image display apparatus such as a liquid crystal display, a plasma display, or an electroluminescence display (including an image display apparatus having a touch panel function and an image display apparatus having no touch panel function), particularly an image display apparatus having a touch panel function.

The article including the hard coat laminated film according to at least one embodiment is not particularly limited, but examples thereof include a window, a door, or the like for a building; a television, a personal computer, a tablet type information device, a smartphone, and housings and display surface plates thereof; a refrigerator, a washing machine, a cupboard, a wardrobe, and panels constituting these; a vehicle, a window of a vehicle, a windshield, a roof window, an instrument panel, or the like; an electronic signboard and a protective plate thereof; and a show window.

In producing an article using the hard coat laminated film according to at least one embodiment, in order to impart high designability to an obtained article, a decorative sheet may be laminated on a surface of the resin film, opposite to the first hard coat forming surface. Such an embodiment is particularly effective when the hard coat laminated film according to at least one embodiment is used as a front panel of a door body for opening and closing a front portion of a main body of an article such as a refrigerator, a washing machine, a cupboard, or a wardrobe, or a flat panel of a lid body for opening and closing a flat portion of the main body. The decorative sheet is not limited, but any decorative sheet can be used. As the decorative sheet, for example, any colored resin sheet can be used.

The colored resin sheet is not particularly limited, but examples thereof include a polyester resin such as aromatic polyester or aliphatic polyester; an acrylic resin; a polycarbonate resin; a poly(meth)acrylimide resin; a polyolefin resin such as polyethylene, polypropylene, or polymethylpentene; a cellulose resin such as cellophane, triacetylcellulose, diacetylcellulose, or acetylcellulose butyrate; a styrene resin such as polystyrene, an acrylonitrile-butadiene-styrene copolymer resin (ABS resin), a styrene-ethylene-propylene-styrene copolymer, a styrene-ethylene-ethylene-propylene-styrene copolymer, or a styrene-ethylene-butadiene-styrene copolymer; a polyvinyl chloride resin; a polyvinylidene chloride resin; a fluorine-containing resin such as polyvinylidene fluoride; polyvinyl alcohol, ethylene vinyl alcohol, polyether ether ketone, nylon, polyamide, polyimide, polyurethane, polyetherimide, polysulfone, and polyethersulfone. These sheets include an unstretched sheet, a uniaxially stretched sheet, and a biaxially stretched sheet. These sheets also include a laminated sheet obtained by laminating two or more layers of one or more kinds thereof.

The thickness of the colored resin sheet is not particularly limited, but may be usually 20 μm or more, preferably 50 μm or more, and more preferably 80 μm or more. In addition, the thickness of the colored resin sheet may be usually 1500 μm or less, preferably 800 μm or less, and more preferably 400 μm or less from a viewpoint of meeting a requirement for a thinner article.

A printed layer may be provided on an outer surface of the colored resin sheet, if desired, in order to enhance the sense of design. The printed layer is provided in order to impart high designability. The printed layer can be formed by printing any pattern using any ink and any printing machine.

Printing can be performed directly or via an anchor coating entirely or partially on a surface of the resin film, opposite to the first hard coat forming surface thereof, and/or on an outer surface of the colored resin sheet. Examples of the pattern include a metal-like pattern such as hair lines, a grain pattern, a stone mesh pattern imitating a surface of a rock such as marble, a fabric pattern imitating texture or a cloth-like pattern, a tile stitch pattern, a brickwork pattern, a parquet pattern, and a patchwork. As the printing ink, an ink obtained by appropriately mixing a pigment, a solvent, a stabilizer, a plasticizer, a catalyst, a curing agent, and the like with a binder can be used. Examples of the binder include a resin such as a polyurethane resin, a vinyl chloride-vinyl acetate copolymer resin, a vinyl chloride-vinyl acetate-acrylate copolymer resin, a chlorinated polypropylene resin, an acrylic resin, a polyester resin, a polyamide resin, a butyral resin, a polystyrene resin, a nitrocellulose resin, or a cellulose acetate resin, and a resin composition thereof. In addition, in order to provide a metal-like design, aluminum, tin, titanium, indium, an oxide thereof, or the like may be vapor-deposited directly or via an anchor coating entirely or partially on a surface of the resin film, opposite to the first hard coat forming surface thereof, and/or on an outer surface of the colored resin sheet by a known method.

Lamination of the resin film and the decorative sheet is not particularly limited, but can be performed by any method. Examples of the method include a dry lamination method using a known adhesive agent and a method for forming a layer of a known pressure-sensitive adhesive agent and then superimposing and pressing the above two.

EXAMPLES

Hereinafter, the present invention will be described with reference to Examples, but the present invention is not limited thereto.

Measurement Method (i) Total Light Transmittance

The total light transmittance of a hard coat laminated film was measured according to JIS K7361-1:1997 using a turbidimeter "NDH2000" (trade name) available from Nippon Denshoku Industries Co., Ltd.

(ii) Pencil Hardness

The pencil hardness of a first hard coat surface of a hard coat laminated film was measured according to JIS K5600-5-4 using a pencil "UNI" (trade name) available from Mitsubishi Pencil Co., Ltd under a condition of a load of 750 g.

(iii) Yellowness Index

The yellowness index of a hard coat laminated film was measured according to JIS K7105:1981 using a chromaticity meter "SolidSpec-3700" (trade name) available from Shimadzu Corporation.

(iv) Water Contact Angle (Initial Water Contact Angle)

The water contact angle at a first hard coat surface of a hard coat laminated film was measured by a method for calculating the water contact angle from a width and a height of a water droplet (see JIS R3257:1999) using an automatic contact angle meter "DSA20" (trade name) available from KRUSS GmbH.

(v) Abrasion Tesistance 1 (Water Contact Angle After Wipe with a Cotton)

A test piece was taken such that the size thereof was 150 mm in length and 50 mm in width and the machine direction of a hard coat laminated film was in the longitudinal direction of the test piece. This test piece was placed on a Gakushin tester according to JIS L0849:2013 such that a first hard coat of the hard coat laminated film was a front side. A stainless steel plate (10 mm in length, 10 mm in width, 1 mm in thickness) covered with a four-stacked-sheet gauze (medical type 1 gauze available from Kawamoto Corp.) was attached to a friction terminal of the Gakushin tester such that the length and width surface of the stainless steel plate was brought into contact with the test piece. A load of 350 g was placed on the stainless steel plate covered with the gauze. The first hard coat surface of the test piece was rubbed reciprocatingly 10,000 times under conditions of a moving distance of the friction terminal of 60 mm and a speed of one reciprocation/sec. Thereafter, the water contact angle of the cotton-wiped portion was measured according to the method of the (iv). When the water contact angle was 100° or more, an operation of additionally performing 5,000 reciprocating rubs and then measuring the water contact angle of the cotton-wiped portion in accordance with the method of the (iv) was repeated, and abrasion resistance was evaluated according to the following criteria.

A: The water contact angle was 100° or more even after 25,000 reciprocating rubs.

B: The water contact angle was 100° or more after 20,000 reciprocating rubs, but the water contact angle was less than 100° after 25,000 reciprocating rubs.

C: The water contact angle was 100° or more after 15,000 reciprocating rubs, but the water contact angle was less than 100° after 20,000 reciprocating rubs.

D: The water contact angle was 100° or more after 10,000 reciprocating rubs, but the water contact angle was less than 100° after 15,000 reciprocating rubs.

E: The water contact angle was less than 100° after 10000 reciprocating rubs.

(vi) Abrasion Resistance 2 (Steel Wool Resistance)

A hard coat laminated film was placed on a Gakushin tester in accordance with JISL0849:2013 such that a first hard coat thereof was a front side. Subsequently, a steel wool of #0000 was attached to a friction terminal of the Gakushin tester, and a load of 500 g was then placed. A surface of the test piece was rubbed reciprocatingly 100 times, and then the rubbed portion was visually observed. When no scratch was observed, an operation of additionally performing 100 reciprocating rubs and then visually observing the rubbed portion was repeated, and abrasion resistance was evaluated according to the following criteria.

A: No scratch was observed even after 500 reciprocating rubs.

B: No scratch was observed after 400 reciprocating rubs, but a scratch could be observed after 500 reciprocating rubs.

C: No scratch was observed after 300 reciprocating rubs, but a scratch could be observed after 400 reciprocating rubs.

D: No scratch was observed after 200 reciprocating rubs, but a scratch could be observed after 300 reciprocating rubs.

E: No scratch was observed after 100 reciprocating rubs, but a scratch could be observed after 200 reciprocating rubs.

F: A scratch could be observed after 100 reciprocating rubs.

(vii) Surface Smoothness (Surface Appearance)

While surfaces (both surfaces) of a hard coat laminated film were irradiated with light of a fluorescent lamp by changing an incident angle in various directions, the surfaces were visually observed, and surface smoothness was evaluated according to the following criteria.

◉ (very good): The surface had no undulation or scratch. Even when the surface was viewed closely by letting light pass therethrough, there was no impression of cloudiness.

○ (good): When the surface was viewed closely by letting light pass therethrough, the surface had a portion giving an impression of slight cloudiness.

Δ (slightly poor): When being viewed closely, the surface had slightly recognized undulations and scratches. The surface also gave an impression of cloudiness.

× (poor): The surface had a large number of recognized undulations and scratches. The surface also gave a definite impression of cloudiness.

(viii) Square Lattice Pattern Test (Adhesiveness)

According to JIS K5600-5-6:1999, a square lattice pattern cut consisting of 100 cells (1 cell=1 mm×1 mm) was formed on a hard coat laminated film from a first hard coat surface side. Thereafter, a tape for an adhesion test was pasted on the square lattice pattern, was rubbed with fingers, and was then peeled off. The criteria for evaluation were in accordance with Table 1 in the above JIS standard.

Classification 0: Edges of the cuts were completely smooth, and none of the squares of the lattice was peeled off.

Classification 1: Small peeling of a coat was observed at intersections of the cuts. A cross-cut area of clearly not more than 5% was affected.

Classification 2: A coat was peeled off along edges and/or at intersections of the cuts. A cross-cut area of clearly more than 5% but not more than 15% was affected.

Classification 3: A coat was largely peeled off along edges of the cuts partially or entirely, and/or various parts of squares were peeled off partially or entirely. A cross-cut area of clearly more than 15% but not more than 35% was affected.

Classification 4: A coat was largely peeled off along edges of the cuts partially or entirely, and/or some parts of squares were peeled off partially or entirely. A cross-cut area of clearly more than 35% but not more than 65% was affected.

Classification 5: A case where the degree of peeling was more than that in Classification 4.

(ix) Minimum Bending Radius

With reference to bending formability (B method) in JIS-K6902:2007, a test piece was conditioned at a temperature of 23° C.±2° C. and a relative humidity of 50±5% for 24 hours, and thereafter the test piece was bent at a bending temperature of 23° C.±2° C. at a bending line in a direction perpendicular to the machine direction of a hard coat laminated film such that a first hard coat of the hard coat laminated film was on the outer side to form a curved surface, and the minimum bending radius was measured. The radius of a front face having the smallest radius of a front face among shaping jigs with no crack generated was defined as the minimum bending radius. The "front face" has the same meaning as the term regarding a shaping jig in the B method defined in Paragraph 18.2 in JIS K6902:2007.

(x) Cutting Processability (Condition of Curved Cutting-Processed Line)

A cut hole of a true circle with a diameter of 2 mm and a cut hole of a true circle with a diameter of 0.5 mm were formed in a hard coat laminated film using a router processing machine automatically controlled by a computer. A mill used at this time was a four-bladed super-hard-alloy mill with nicks, having a cylindrically round tip, and a blade diameter was appropriately selected according to a portion to be processed. Subsequently, a cut edge surface of the cut hole with a diameter of 2 mm was observed visually or with a microscope (100 times), and cutting processability was evaluated according to the following criteria. Similarly, a cut edge surface of the cut hole with a diameter of 0.5 mm was observed visually or with a microscope (100 times) and cutting processability was evaluated according to the following criteria. Tables show the result of the former case and the result of the latter case in this order.

⊚ (very good): No crack or burr was observed even with a microscope.

○ (good): No crack was observed even with a microscope. However, a burr was observed.

Δ (slightly poor): No crack was observed visually. However, a crack was observed with a microscope.

× (poor): A crack was observed even visually.

(xi) Weather Resistance

An accelerated weather resistance test of 300 hours was performed using a sunshine carbon arc lamp type weather resistance tester prescribed in JIS B7753:2007 under conditions of JIS A5759:2008 in Table 10 (a test piece which had been taken from a hard coat laminated film such that the size was 125 mm in length and 50 mm in width was used as it was, and the test piece was not pasted on glass). The N number of tests was three. In all the tests, a case where there was no change in appearance such as swelling, cracking, or peeling in a test piece of a hard coat laminated film was evaluated as an acceptable product (indicated as ⊚ in Tables), and the other cases were evaluated as an unacceptable product (indicated as × in Tables).

(xii) Haze

The haze of a hard coat laminated film was measured according to JIS K7136:2000 using a turbidimeter "NDH2000" (trade name) available from Nippon Denshoku Industries Co., Ltd.

(xiii) Y Value of XYZ Colorimetric System Based on 2 Degree Visual Field

Using a spectrophotometer "SolidSpec-3700" (trade name) available from Shimadzu Corporation and a reflecting unit "absolute reflectance measuring apparatus incident angle 5°" (trade name), a Y value of an XYZ calorimetric system was measured under a condition of 5° specular reflection (a reflecting unit was disposed in front of an integrating sphere) according to a manual of the spectrophotometer.

Raw Materials Used (A) Polyfunctional (meth)acrylate (A-1) Dipentaerythritol hexaacrylate (hexafunctional)

(A-2) Pentaerythritol triacrylate (trifunctional)

(B) Water Repellent Agent (B-1) An acryloyl group-containing fluoropolyether water repellent agent "KY-1203" (trade name) available from Shin-Etsu Chemical Co., Ltd.: solid content 20% by mass (B-2) A methacryloyl group-containing fluoropolyether water repellent agent "FOMBLIN MT70" (trade name) available from Solvay S.A.: solid content 70% by mass (C) Silane Coupling Agent (C-1) N-2-(aminoethyl)-3-aminopropylmethyldimethoxysilane "KBM-602" (trade name) available from Shin-Etsu Chemical Co., Ltd.

(C-2) N-2-(aminoethyl)-3-aminopropyltrimethoxysilane "KBM-603" (trade name) available from Shin-Etsu Chemical Co., Ltd.

(C-3) 3-Aminopropyltrimethoxysilane "KBM-903" (trade name) available from Shin-Etsu Chemical Co., Ltd.

(C-4) 3-Mercaptopropylmethyldimethoxysilane "KBM-802" (trade name) available from Shin-Etsu Chemical Co., Ltd.

(C-5) 3-Glycidoxypropyltrimethoxysilane "KBM-403" (trade name) available from Shin-Etsu Chemical Co., Ltd.

(D) Inorganic Fine Particles Having an Average Particle Diameter of 1 to 300 nm (D-1) Silica fine particles which have been subjected to a surface treatment with a silane coupling agent having a vinyl group, and have an average particle diameter of 20 nm (E) Leveling Agent (E-1) A silicone-acrylate copolymer leveling agent "DISPARLON NSH-8430HF" (trade name) available from Kusumoto Chemicals, Ltd.: solid content 10% by mass (E-2) A silicone-acrylate copolymer leveling agent "BYK-3550" (trade name) available from BYK Japan KK: solid content 52% by mass (E-3) An acrylic polymer leveling agent "BYK-399" (trade name) available from BYK Japan KK: solid content 100% by mass (E-4) A silicone leveling agent "DISPARLON LS-480" (trade name) available from Kusumoto Chemicals, Ltd.: solid content 100% by mass (F) Fine Particles Having an Average Particle Diameter of 0.5 to 10 μm (F-1) Truly spherical silicone resin fine particles "Tospearl 120" (trade name) available from Momentive Performance Materials Corporation: average particle diameter 2 μm (F-2) Truly spherical silicone resin fine particles "Tospearl 130" (trade name) available from Momentive Performance Materials Corporation: average particle diameter 3 μm (F-3) Acrylic resin fine particles "MA-180TA" (trade name) available from Soken Chemical & Engineering Co., Ltd.: average particle diameter 1.8 μm (F-4) Acrylic resin fine particles "MX-80H3wT" (trade name) available from Soken Chemical & Engineering Co., Ltd.: average particle diameter 0.5 μm (F-5) Acrylic resin fine particles "FH-S010" (trade name) available from Toyobo Co., Ltd.: average particle diameter 10 μm (F-6) Silica fine particles "SO-E6" (trade name) available from Admatex Corporation:
average particle diameter 2 μm
(G) Optional Component
(G-1) A phenyl ketone photopolymerization initiator (1-hydroxycyclohexyl phenyl ketone) "SB-PI714" (trade name) available from Shuang Bang Industrial Corp.
(G-2) 1-Methoxy-2-propanol
(H1) First Hard Coat Forming Coating Material
(H1-1) A first hard coat forming coating material was obtained by mixing and stirring 100 parts by mass of the (A-1), 2 parts by mass (0.40 parts by mass in terms of solid content) of the (B-1), 0.06 parts by mass (0.042 parts by mass in terms of solid content) of the (B-2), 0.5 parts by mass of the (C-1), 4 parts by mass of the (G-1), and 100 parts by mass of the (G-2). Table 1 is a table listing components and their blending amounts. As far as the (B-1) and the (B-2) are concerned, Table 1 shows values in terms of solid content.

(H1-2 to H1-28) First hard coat forming coating materials were obtained in a similar manner to the (H1-1) except that the components and blending amounts thereof were changed as shown in any one of Tables 1 to 3. As far as the (B-1) and the (B-2) are concerned, Tables 1-3 each show values in terms of solid content.

TABLE 1

| Component (part by mass) | First hard coat forming coating material |||||||||
|---|---|---|---|---|---|---|---|---|---|
|  | H1-1 | H1-2 | H1-3 | H1-4 | H1-5 | H1-6 | H1-7 | H1-8 | H1-9 |
| A-1 | 100 | 100 | 100 | 100 | 100 | 100 | 100 | 100 | 100 |
| B-1 | 0.40 | 0.080 | 0.80 | 2.0 | — | 8.0 | 0.40 | 0.40 | 0.40 |
| B-2 | 0.042 | 0.0084 | 0.084 | 0.21 | — | 0.84 | 0.042 | 0.042 | 0.042 |
| C-1 | 0.5 | 0.5 | 0.5 | 0.5 | 0.5 | 0.5 | 0.5 | — | 0.01 |
| C-2 | — | — | — | — | — | — | — | — | — |
| C-3 | — | — | — | — | — | — | — | — | — |
| C-4 | — | — | — | — | — | — | — | — | — |
| C-5 | — | — | — | — | — | — | — | — | — |
| D-1 | — | — | — | — | — | — | 20 | — | — |
| F-1 | — | — | — | — | — | — | — | — | — |
| F-2 | — | — | — | — | — | — | — | — | — |
| F-3 | — | — | — | — | — | — | — | — | — |
| F-4 | — | — | — | — | — | — | — | — | — |
| F-5 | — | — | — | — | — | — | — | — | — |
| F-6 | — | — | — | — | — | — | — | — | — |
| G-1 | 4 | 4 | 4 | 4 | 4 | 4 | 4 | 4 | 4 |
| G-2 | 100 | 100 | 100 | 100 | 100 | 80 | 130 | 100 | 100 |

TABLE 2

| Component (part by mass) | First hard coat forming coating material |||||||||
|---|---|---|---|---|---|---|---|---|---|
|  | H1-10 | H1-11 | H1-12 | H1-13 | H1-14 | H1-15 | H1-16 | H1-17 | H1-18 |
| A-1 | 100 | 100 | 100 | 100 | 100 | 100 | 100 | 100 | 100 |
| B-1 | 0.40 | 0.40 | 0.40 | 0.40 | 0.40 | 0.40 | 0.40 | 0.40 | 0.40 |
| B-2 | 0.042 | 0.042 | 0.042 | 0.042 | 0.042 | 0.042 | 0.042 | 0.042 | 0.042 |
| C-1 | 0.1 | 1 | 5 | — | — | — | — | 0.5 | 0.5 |
| C-2 | — | — | — | 0.5 | — | — | — | — | — |
| C-3 | — | — | — | — | 0.5 | — | — | — | — |
| C-4 | — | — | — | — | — | 0.5 | — | — | — |
| C-5 | — | — | — | — | — | — | 0.5 | — | — |
| D-1 | — | — | — | — | — | — | — | — | — |
| F-1 | — | — | — | — | — | — | — | 2 | 0.4 |
| F-2 | — | — | — | — | — | — | — | — | — |
| F-3 | — | — | — | — | — | — | — | — | — |
| F-4 | — | — | — | — | — | — | — | — | — |
| F-5 | — | — | — | — | — | — | — | — | — |
| F-6 | — | — | — | — | — | — | — | — | — |
| G-1 | 4 | 4 | 4 | 4 | 4 | 4 | 4 | 4 | 4 |
| G-2 | 100 | 100 | 105 | 100 | 100 | 100 | 100 | 100 | 100 |

TABLE 3

| Component (part by mass) | First hard coat forming coating material |||||||||
|---|---|---|---|---|---|---|---|---|---|
|  | H1-19 | H1-20 | H1-21 | H1-22 | H1-23 | H1-24 | H1-25 | H1-26 | H1-27 | H1-28 |
| A-1 | 100 | 100 | 100 | 100 | 100 | 100 | 100 | 100 | 100 | 100 |
| B-1 | 0.40 | 0.40 | 0.40 | 0.40 | 0.40 | 0.40 | 0.40 | 0.40 | 0.40 | 0.40 |
| B-2 | 0.042 | 0.042 | 0.042 | 0.042 | 0.042 | 0.042 | 0.042 | 0.042 | 0.042 | 0.042 |

TABLE 3-continued

| Component | First hard coat forming coating material | | | | | | | | | |
|---|---|---|---|---|---|---|---|---|---|---|
| (part by mass) | H1-19 | H1-20 | H1-21 | H1-22 | H1-23 | H1-24 | H1-25 | H1-26 | H1-27 | H1-28 |
| C-1 | 0.5 | 0.5 | 0.5 | 0.5 | 0.5 | 0.5 | 0.5 | 0.5 | 0.5 | — |
| C-2 | — | — | — | — | — | — | — | — | — | — |
| C-3 | — | — | — | — | — | — | — | — | — | — |
| C-4 | — | — | — | — | — | — | — | — | — | — |
| C-5 | — | — | — | — | — | — | — | — | — | — |
| D-1 | — | — | — | — | — | — | — | — | — | — |
| F-1 | 0.9 | 4 | 8 | 15 | — | — | — | — | — | — |
| F-2 | — | — | — | — | 2 | — | — | — | — | — |
| F-3 | — | — | — | — | — | 2 | — | — | — | — |
| F-4 | — | — | — | — | — | — | 2 | — | — | — |
| F-5 | — | — | — | — | — | — | — | 2 | — | — |
| F-6 | — | — | — | — | — | — | — | — | 2 | — |
| G-1 | 4 | 4 | 4 | 4 | 4 | 4 | 4 | 4 | 4 | 4 |
| G-2 | 100 | 100 | 100 | 100 | 100 | 100 | 100 | 100 | 100 | 100 |

[Table 4]
(H2) Second Hard Coat Forming Coating Material
(H2-1) A second hard coat forming coating material was obtained by mixing and stirring 100 parts by mass of the (A-2), 140 parts by mass of the (D-1), 2 parts by mass (0.2 parts by mass in terms of solid content) of the (E-1), 17 parts by mass of the (G-1), and 200 parts by mass of the (G-2). Table 4 is a table listing components and their blending amounts. As far as the (E-1) is concerned, Table 4 shows a value in terms of solid content.

(H2-2 to H2-15) A second hard coat forming coating material was obtained in a similar manner to the (H2-1) except that the components and blending amounts thereof were changed as shown in Table 4 or 5. As far as the (E-2) as well as the (E-1) is concerned, Table 4 or 5 also shows values in terms of solid content.

TABLE 4

| Component | Second hard coat forming coating material | | | | | | |
|---|---|---|---|---|---|---|---|
| (part by mass) | H2-1 | H2-2 | H2-3 | H2-4 | H2-5 | H2-6 | H2-7 |
| A-2 | 100 | 100 | 100 | 100 | 100 | 100 | 100 |
| D-1 | 140 | 140 | 140 | 140 | 140 | 140 | 140 |
| E-1 | 0.2 | — | 0.1 | 0.4 | 0.6 | 1.5 | — |
| E-2 | — | — | — | — | — | — | 0.2 |
| E-3 | — | — | — | — | — | — | — |
| E-4 | — | — | — | — | — | — | — |
| G-1 | 17 | 17 | 17 | 17 | 17 | 17 | 17 |
| G-2 | 200 | 200 | 200 | 200 | 200 | 200 | 200 |

TABLE 5

| Component | Second hard coat forming coating material | | | | | | | |
|---|---|---|---|---|---|---|---|---|
| (part by mass) | H2-8 | H2-9 | H2-10 | H2-11 | H2-12 | H2-13 | H2-14 | H2-15 |
| A-2 | 100 | 100 | 100 | 100 | 100 | 100 | 100 | 100 |
| D-1 | 140 | 140 | 140 | 80 | 200 | 30 | 400 | — |
| E-1 | — | — | — | 0.2 | 0.2 | 0.2 | 0.2 | 0.2 |
| E-2 | 0.4 | — | — | — | — | — | — | — |
| E-3 | — | 0.3 | — | — | — | — | — | — |
| E-4 | — | — | 0.3 | — | — | — | — | — |
| G-1 | 17 | 17 | 17 | 17 | 17 | 17 | 17 | 17 |
| G-2 | 200 | 200 | 200 | 155 | 250 | 120 | 420 | 100 |

(α) Acrylic Resin (α-1) An acrylic resin including 76.8% by mole of a structural unit derived from methyl methacrylate and 23.2% by mole of a structural unit derived from vinylcyclohexane relative to 100% by mole of the total amount of structural units derived from a polymerizable monomer was used. The structure of the (α-1) acrylic resin was identified under the above $^1$H-NMR condition. FIG. 2 illustrates the $^1$H-NMR spectrum.

(α-2) An acrylic resin including 63.2% by mole of a structural unit derived from methyl methacrylate and 36.8% by mole of a structural unit derived from vinylcyclohexane relative to 100% by mole of the total amount of structural units derived from a polymerizable monomer was used. The structure of the (α-2) acrylic resin was identified under the above $^1$H-NMR condition.

(α-3) An acrylic resin including 100% by mole of a structural unit derived from methyl methacrylate relative to 100% by mole of the total amount of structural units derived from a polymerizable monomer was used. The structure of the (α-3) acrylic resin was identified under the above $^1$H-NMR condition.

Figure 4:
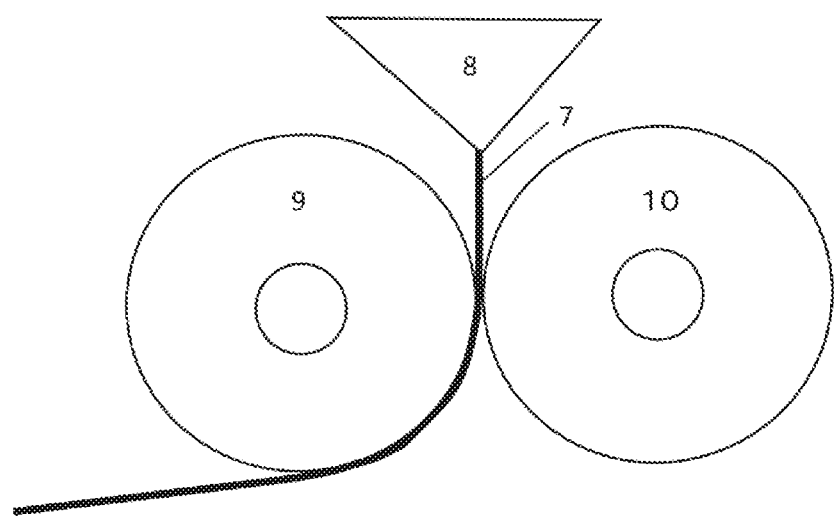
FIG. 4 is a conceptual diagram of an apparatus used for forming a transparent resin film in Examples.

(a) Resin Film
(a-1) Using an apparatus equipped with a two-kind/three-layer multimanifold-type co-extrusion T-die and a winder having a mechanism for pressing a melted film with a first mirror-finished roll (i.e., a roll to hold a melted film and send the melted film to a subsequent transfer roll) and a second mirror-finished roll, a two-kind/three-layer multilayer resin film in which both outer layers ((α1) layer and (α2) layer) were formed of the (α-1) and an intermediate layer (β layer) was formed of an aromatic polycarbonate "CALIBRE 302-4" (trade name) available from Sumika Styron Polycarbonate Limited was continuously co-extruded from the co-extrusion T-die. This co-extruded product was supplied and introduced between the rotating first mirror-finished roll and second mirror-finished roll such that the (α1) layer was on the first mirror-finished roll side, and was pressed to obtain a transparent resin film having a total thickness of 250 μm, a layer thickness of the (α1) layer of 80 μm, a layer thickness of the (β) layer of 90 μm, and a layer thickness of the (α2) layer of 80 μm. As setting conditions at this time, a set temperature of the T-die was 260° C., a set temperature of the first mirror-finished roll was 120° C., a set temperature of the second mirror-finished roll was 110° C., and a wind-up speed was 6.5 m/min FIG. 4 is a conceptual diagram of an apparatus used for forming the transparent resin film. In FIG. 4, the reference numeral 8 indicates a T-die, the reference numeral 7 indicates a melted resin film extruded from the T-die, the reference numeral 9 indicates a first mirror-finished roll, and the reference numeral 10 indicates a second mirror-finished roll. An apparatus similar to this apparatus was also used for film formation of the following transparent resin films (a-2) to (a-6).

(a-2) A transparent resin film having a total thickness of 250 μm, a layer thickness of the (α1) layer of 80 μm, a layer thickness of the (γ) layer of 90 μm, and a layer thickness of the (α2) layer of 80 μm was obtained in a similar manner to the (a-1) except that a resin composition (γ) of 100 parts by mass of the (α-1) and 10 parts by mass of a methacrylate-acrylonitrile/acrylate rubber graft copolymer "KaneAce FM-40" (trade name) available from Kaneka Corporation was used as an intermediate layer. As setting conditions at this time, a set temperature of the T-die was 260° C., a set temperature of the first mirror-finished roll was 120° C., a set temperature of the second mirror-finished roll was 110° C., and a wind-up speed was 6.5 m/min (a-3) A transparent resin film having a total thickness of 250 μm, a layer thickness of the (α1) layer of 80 μm, a layer thickness of the (γ) layer of 90 μm, and a layer thickness of the (α2) layer of 80 μm was obtained in a similar manner to the (a-1) except that a resin mixture of 40 parts by mass of the (α-1) and 60 parts by mass of the (α-3) was used as both outer layers. As setting conditions at this time, a set temperature of the T-die was 260° C., a set temperature of the first mirror-finished roll was 120° C., a set temperature of the second mirror-finished roll was 110° C., and a wind-up speed was 6.5 m/min (a-4) Using an apparatus equipped with a monolayer T-die and a winder having a mechanism for pressing a melted film with a first mirror-finished roll (i.e., a roll to hold a melted film and send the melted film to a subsequent transfer roll) and a second mirror-finished roll, the (α-2) was continuously extruded from the T-die, was supplied and introduced between the rotating first mirror-finished roll and second mirror-finished roll, and was pressed to obtain a transparent resin film having a total thickness of 250 μm. As setting conditions at this time, a set temperature of the T-die was 240° C., a set temperature of the first mirror-finished roll was 120° C., a set temperature of the second mirror-finished roll was 110° C., and a wind-up speed was 6.5 m/min (a-5) A transparent resin film having a total thickness of 250 μm was obtained in a similar manner to the (a-4) except that a resin mixture of 40 parts by mass of the (α-2) and 60 parts by mass of the (α-3) was used. As setting conditions at this time, a set temperature of the T-die was 240° C., a set temperature of the first mirror-finished roll was 120° C., a set temperature of the second mirror-finished roll was 110° C., and a wind-up speed was 6.5 m/min.

(a-6) A transparent resin film having a total thickness of 250 μm was obtained in a similar manner to the (a-4) except that the (α-3) was used. As setting conditions at this time, a set temperature of the T-die was 240° C., a set temperature of the first mirror-finished roll was 120° C., a set temperature of the second mirror-finished roll was 110° C., and a wind-up speed was 6.5 m/min

Example 1

Both surfaces of the (a-1) were subjected to a corona discharge treatment. Both surfaces had a wetting index of 64 mN/m. Subsequently, the (H2-1) was applied onto one surface of the (a-1) using a die-type applicator such that the wet thickness was 40 μm (thickness after curing 22 μm). Subsequently, the resulting product was allowed to pass through a drying furnace set at an inner temperature of 90° C. at a line speed such that the time required to pass from the inlet to the outlet was one minute. Thereafter, the resulting product was treated using a curing apparatus (see FIG. 5) having a high-pressure mercury lamp type ultraviolet irradiator 11 and a mirror-finished metal roll 12 having a diameter of 25.4 cm disposed opposite to each other under conditions of a temperature of the mirror-finished metal roll 12 of 90° C. and an integrated amount of light of 80 mJ/cm$^2$. In FIG. 5, the reference numeral 13 indicates a web, and the reference numeral 14 indicates a holding angle. The wet coat of the (H2-1) became a coat in a set-to-touch state. Subsequently, the (H1-1) was applied onto the coat of the (H2-1) in a set-to-touch state using a die-type applicator such that the wet thickness was 4 μm (thickness after curing 2 μm). Subsequently, the resulting product was allowed to pass through a drying furnace set at an inner temperature of 80° C. at a line speed such that the time required to pass from the inlet to the outlet was one minute. Thereafter, the resulting product was treated using a curing apparatus (see FIG. 5) having a high-pressure mercury lamp type ultraviolet irradiator 11 and a mirror-finished metal roll 12 having a diameter of 25.4 cm disposed opposite to each other under conditions of a temperature of the mirror-finished metal roll 12 of 60° C. and an integrated amount of light of 480 mJ/cm$^2$ to form a first hard coat and a second hard coat. Subsequently, a third hard coat was formed on the other surface of the (a-1) with the same coating material as that used in forming the second hard coat (the (H2-1) in this Example) using a die-type applicator such that the thickness after curing was 22 μm to obtain a hard coat laminated film. This hard coat laminated film was subjected to the above tests (i) to (xiii) for measurement and evaluation of physical properties. Table 6 shows results thereof. Here, the first HC means the first hard coat in Tables. Similarly, the second HC means the second hard coat.

Examples 2 to 6

A hard coat laminated film was produced, and the above tests (i) to (xiii) for measurement and evaluation of physical properties thereof were performed in a similar manner to Example 1 except that a resin film shown in Table 6 was used. Table 6 shows results thereof.

Examples 7 to 21 and Examples 44 to 54

A hard coat laminated film was produced, and the above tests (i) to (xiii) for measurement and evaluation of physical properties thereof were performed in a similar manner to Example 1 except that a first hard coat forming coating material shown in any one of Tables 6 to 8, 11, and 12 was used. Any one of Tables 6 to 8, 11, and 12 shows results thereof.

Examples 22 to 35

A hard coat laminated film was produced, and the above tests (i) to (xiii) for measurement and evaluation of physical properties thereof were performed in a similar manner to Example 1 except that a second hard coat forming coating material shown in any one of Tables 8 to 10 was used. Any one of Tables 8 to 10 shows results thereof.

Examples 36 to 39

A hard coat laminated film was produced, and the above tests (i) to (xiii) for measurement and evaluation of physical properties thereof were performed in a similar manner to Example 1 except that the thickness of the first hard coat was changed as shown in Table 10. Table 10 shows results thereof.

Examples 40 to 43

A hard coat laminated film was produced, and the above tests (i) to (xiii) for measurement and evaluation of physical properties thereof were performed in a similar manner to Example 1 except that the thickness of the second hard coat was changed as shown in Table 10 or 11. Table 10 or 11 shows results thereof.

Example 55

Both surfaces of the (a-1) were subjected to a corona discharge treatment. Both surfaces had a wetting index of 64 mN/m. Subsequently, the (H1-28) was applied onto one surface of the (a-1) using a die-type applicator such that the wet thickness was 20 μm (thickness after curing 10 μm). Subsequently, the resulting product was allowed to pass through a drying furnace set at an inner temperature of 90° C. at a line speed such that the time required to pass from the inlet to the outlet was one minute. Thereafter, the resulting product was treated using a curing apparatus (see FIG. 5) having a high-pressure mercury lamp type ultraviolet irradiator 11 and a mirror-finished metal roll 12 having a diameter of 25.4 cm disposed opposite to each other under conditions of a temperature of the mirror-finished metal roll 12 of 60° C. and an integrated amount of light of 480 mJ/cm$^2$ to form a first hard coat. Subsequently, a third hard coat was formed on the other surface of the (a-1) with the (H1-28) using a die-type applicator such that the thickness after curing was 10 μm to obtain a hard coat laminated film. This hard coat laminated film was subjected to the above tests (i) to (xiii) for measurement and evaluation of physical properties. Table 12 shows results thereof.

TABLE 6

| | | Example 1 | Example 2 | Example 3 | Example 4 | Example 5 | Example 6 | Example 7 | Example 8 |
|---|---|---|---|---|---|---|---|---|---|
| Composition | First HC coating material | H1-1 | H1-1 | H1-1 | H1-1 | H1-1 | H1-1 | H1-2 | H1-3 |
| | Thickness of first HC μm | 2 | 2 | 2 | 2 | 2 | 2 | 2 | 2 |
| | Second HC coating material | H2-1 | H2-1 | H2-1 | H2-1 | H2-1 | H2-1 | H2-1 | H2-1 |
| | Thickness of second HC μm | 22 | 22 | 22 | 22 | 22 | 22 | 22 | 22 |
| | Transparent resin film | a-1 | a-2 | a-3 | a-4 | a-5 | a-6 | a-1 | a-1 |
| Evaluation results | Total light transmittance % | 92.0 | 91.5 | 91.8 | 92.3 | 92.1 | 91.8 | 92.0 | 91.9 |
| | Pencil hardness | 7H | 7H | 7H | 7H | 7H | 7H | 7H | 7H |
| | Yellowness index | 0.3 | 0.3 | 0.3 | 0.3 | 0.3 | 0.3 | 0.3 | 0.3 |
| | Water contact angle deg | 116 | 116 | 116 | 116 | 116 | 116 | 115 | 116 |
| | Abrasion resistance 1 | A | A | A | A | A | A | B | A |
| | Abrasion resistance 2 | A | A | A | A | A | A | A | A |
| | Surface smoothness | ◎ | ◎ | ◎ | ◎ | ◎ | ◎ | ◎ | ◎ |
| | Square lattice pattern test | Classification 0 | Classification 0 | Classification 0 | Classification 0 | Classification 0 | Classification 0 | Classification 0 | Classification 0 |
| | Minimum bending radius mm | 30 | 30 | 30 | 30 | 30 | 30 | 30 | 30 |
| | Cutting processability | ◎-○ | ◎-○ | ◎-○ | Δ-Δ | Δ-Δ | Δ-Δ | ◎-○ | ◎-○ |
| | Weather resistance | ◎ | ◎ | ◎ | ◎ | ◎ | X | ◎ | ◎ |
| | Haze % | 0.3 | 0.3 | 0.3 | 0.2 | 0.3 | 0.3 | 0.2 | 0.4 |
| | Y value of XYZ colorimetric system % | 4.6 | 4.6 | 4.6 | 4.6 | 4.6 | 4.6 | 4.6 | 4.6 |

TABLE 7

|  |  | Example 9 | Example 10 | Example 11 | Example 12 | Example 13 | Example 14 | Example 15 | Example 16 |
| --- | --- | --- | --- | --- | --- | --- | --- | --- | --- |
| Composition | First HC coating material | H1-4 | H1-5 | H1-6 | H1-7 | H1-8 | H1-9 | H1-10 | H1-11 |
|  | Thickness of first HC μm | 2 | 2 | 2 | 2 | 2 | 2 | 2 | 2 |
|  | Second HC coating material | H2-1 | H2-1 | H2-1 | H2-1 | H2-1 | H2-1 | H2-1 | H2-1 |
|  | Thickness of second HC μm | 22 | 22 | 22 | 22 | 22 | 22 | 22 | 22 |
|  | Transparent resin film | a-1 | a-1 | a-1 | a-1 | a-1 | a-1 | a-1 | a-1 |
| Evaluation results | Total light transmittance % | 91.5 | 92.0 | 90.9 | 91.2 | 92.0 | 92.0 | 92.0 | 92.0 |
|  | Pencil hardness | 7H | 5H | 7H | 7H | 7H | 7H | 7H | 7H |
|  | Yellowness index | 0.3 | 0.3 | 0.3 | 0.3 | 0.3 | 0.3 | 0.3 | 0.3 |
|  | Water contact angle deg | 118 | 72 | 119 | 116 | 116 | 116 | 116 | 116 |
|  | Abrasion resistance 1 | A | E | A | E | A | A | A | A |
|  | Abrasion resistance 2 | A | D | A | F | A | A | A | A |
|  | Surface smoothness | ◎ | ◎ | ◎ | ◎ | ◎ | ◎ | ◎ | ◎ |
|  | Square lattice pattern test | Classification 0 | Classification 0 | Classification 0 | Classification 0 | Classification 0 | Classification 0 | Classification 0 | Classification 0 |
|  | Minimum bending radius mm | 30 | 30 | 30 | 30 | 30 | 30 | 30 | 30 |
|  | Cutting processability | ◎-◎ | ◎-◎ | ◎-◎ | ◎-◎ | ◎-◎ | ◎-◎ | ◎-◎ | ◎-◎ |
|  | Weather resistance | ◎ | ◎ | ◎ | ◎ | ◎ | ◎ | ◎ | ◎ |
|  | Haze % | 1.4 | 0.2 | 3.6 | 0.4 | 0.3 | 0.3 | 0.3 | 0.3 |
|  | Y value of XYZ colorimetric system % | 4.6 | 4.6 | 4.6 | 4.6 | 4.6 | 4.6 | 4.6 | 4.6 |

TABLE 8

|  |  | Example 17 | Example 18 | Example 19 | Example 20 | Example 21 | Example 22 | Example 23 | Example 24 |
| --- | --- | --- | --- | --- | --- | --- | --- | --- | --- |
| Composition | First HC coating material | H1-12 | H1-13 | H1-14 | H1-15 | H1-16 | H1-1 | H1-1 | H1-1 |
|  | Thickness of first HC μm | 2 | 2 | 2 | 2 | 2 | 2 | 2 | 2 |
|  | Second HC coating material | H2-1 | H2-1 | H2-1 | H2-1 | H2-1 | H2-2 | H2-3 | H2-4 |
|  | Thickness of second HC μm | 22 | 22 | 22 | 22 | 22 | 22 | 22 | 22 |
|  | Transparent resin film | a-1 | a-1 | a-1 | a-1 | a-1 | a-1 | a-1 | a-1 |
| Evaluation results | Total light transmittance % | 92.0 | 92.0 | 92.0 | 92.0 | 92.0 | 92.0 | 92.0 | 92.0 |
|  | Pencil hardness | 7H | 7H | 7H | 7H | 7H | 7H | 7H | 7H |
|  | Yellowness index | 0.3 | 0.3 | 0.3 | 0.3 | 0.3 | 0.3 | 0.3 | 0.3 |
|  | Water contact angle deg | 116 | 116 | 116 | 116 | 116 | 116 | 116 | 116 |
|  | Abrasion resistance 1 | A | A | A | A | A | B | A | A |
|  | Abrasion resistance 2 | A | A | A | A | A | B | A | A |
|  | Surface smoothness | ◎ | ◎ | ◎ | ◎ | ◎ | ○ | ○ | ◎ |
|  | Square lattice pattern test | Classification 0 | Classification 0 | Classification 0 | Classification 0 | Classification 3 | Classification 0 | Classification 0 | Classification 0 |
|  | Minimum bending radius mm | 30 | 30 | 30 | 30 | 30 | 30 | 30 | 30 |

TABLE 8-continued

|  | Example 17 | Example 18 | Example 19 | Example 20 | Example 21 | Example 22 | Example 23 | Example 24 |
|---|---|---|---|---|---|---|---|---|
| Cutting processability | ◎-○ | ◎-○ | ◎-○ | ◎-○ | ◎-○ | ◎-○ | ◎-○ | ◎-○ |
| Weather resistance | ◎ | ◎ | ◎ | ◎ | ◎ | ◎ | ◎ | ◎ |
| Haze % | 0.3 | 0.3 | 0.3 | 0.3 | 0.3 | 0.4 | 0.3 | 0.3 |
| Y value of XYZ colorimetric system % | 4.6 | 4.6 | 4.6 | 4.6 | 4.6 | 4.6 | 4.6 | 4.6 |

TABLE 9

|  |  | Example 25 | Example 26 | Example 27 | Example 28 | Example 29 | Example 30 | Example 31 | Example 32 |
|---|---|---|---|---|---|---|---|---|---|
| Composition | First HC coating material | H1-1 | H1-1 | H1-1 | H1-1 | H1-1 | H1-1 | H1-1 | H1-1 |
|  | Thickness of first HC μm | 2 | 2 | 2 | 2 | 2 | 2 | 2 | 2 |
|  | Second HC coating material | H2-5 | H2-6 | H2-7 | H2-8 | H2-9 | H2-10 | H2-11 | H2-12 |
|  | Thickness of second HC μm | 22 | 22 | 22 | 22 | 22 | 22 | 22 | 22 |
|  | Transparent resin film | a-1 | a-1 | a-1 | a-1 | a-1 | a-1 | a-1 | a-1 |
| Evaluation results | Total light transmittance % | 92.0 | 92.0 | 92.0 | 92.0 | 92.0 | 92.0 | 92.2 | 92.1 |
|  | Pencil hardness | 7H | 7H | 7H | 7H | 7H | 7H | 6H | 8H |
|  | Yellowness index | 0.3 | 0.3 | 0.3 | 0.3 | 0.3 | 0.3 | 0.3 | 0.3 |
|  | Water contact angle deg | 116 | 116 | 116 | 116 | 116 | 116 | 116 | 116 |
|  | Abrasion resistance 1 | A | A | A | A | A | A | A | A |
|  | Abrasion resistance 2 | A | A | A | A | A | A | A | A |
|  | Surface smoothness | ◎ | ◎ | ◎ | ◎ | ○ | ◎ | ◎ | ◎ |
|  | Square lattice pattern test | Classification 0 | Classification 2 | Classification 0 | Classification 0 | Classification 0 | Classification 2 | Classification 0 | Classification 0 |
|  | Minimum bending radius mm | 30 | 30 | 30 | 30 | 30 | 30 | 20 | 40 |
|  | Cutting processability | ◎-○ | ◎-○ | ◎-○ | ◎-○ | ◎-○ | ◎-○ | ◎-○ | ◎-○ |
|  | Weather resistance | ◎ | ◎ | ◎ | ◎ | ◎ | ◎ | ◎ | ◎ |
|  | Haze % | 0.3 | 0.6 | 0.3 | 0.3 | 0.6 | 0.6 | 0.3 | 0.7 |
|  | Y value of XYZ colorimetric system % | 4.6 | 4.6 | 4.6 | 4.6 | 4.6 | 4.6 | 4.6 | 4.6 |

TABLE 10

|  |  | Example 33 | Example 34 | Example 35 | Example 36 | Example 37 | Example 38 | Example 39 | Example 40 |
|---|---|---|---|---|---|---|---|---|---|
| Composition | First HC coating material | H1-1 | H1-1 | H1-1 | H1-1 | H1-1 | H1-1 | H1-1 | H1-1 |
|  | Thickness of first HC μm | 2 | 2 | 2 | 0.5 | 1 | 3 | 5 | 2 |
|  | Second HC coating material | H2-13 | H2-14 | H2-15 | H2-1 | H2-1 | H2-1 | H2-1 | H2-1 |
|  | Thickness of second HC μm | 22 | 22 | 22 | 22 | 22 | 22 | 22 | 15 |
|  | Transparent resin film | a-1 | a-1 | a-1 | a-1 | a-1 | a-1 | a-1 | a-1 |

TABLE 10-continued

|  |  | Example 33 | Example 34 | Example 35 | Example 36 | Example 37 | Example 38 | Example 39 | Example 40 |
|---|---|---|---|---|---|---|---|---|---|
| Evaluation results | Total light transmittance % | 92.2 | 89.1 | 92.5 | 92.0 | 92.0 | 92.0 | 92.0 | 92.2 |
|  | Pencil hardness | 3H | 9H | H | 5H | 7H | 7H | 7H | 5H |
|  | Yellowness index | 0.3 | 0.3 | 0.3 | 0.3 | 0.3 | 0.3 | 0.3 | 0.3 |
|  | Water contact angle deg | 116 | 116 | 116 | 116 | 116 | 116 | 116 | 116 |
|  | Abrasion resistance 1 | A | A | A | B | A | A | A | A |
|  | Abrasion resistance 2 | A | A | A | B | A | A | A | A |
|  | Surface smoothness | ◎ | ◎ | ◎ | ◎ | ◎ | ◎ | ◎ | ◎ |
|  | Square lattice pattern test | Classification 0 | Classification 0 | Classification 0 | Classification 0 | Classification 0 | Classification 0 | Classification 2 | Classification 0 |
|  | Minimum bending radius mm | 20 | 50 | 20 | 30 | 30 | 30 | 40 | 20 |
|  | Cutting processability | ◎-◎ | ◎-◎ | ◎-◎ | ◎-◎ | ◎-◎ | ◎-◎ | ◎-◎ | ◎-◎ |
|  | Weather resistance | ◎ | ◎ | ◎ | ◎ | ◎ | ◎ | ◎ | ◎ |
|  | Haze % | 0.2 | 3.6 | 0.2 | 0.3 | 0.3 | 0.5 | 0.5 | 0.3 |
|  | Y value of XYZ colorimetric system % | 4.6 | 4.6 | 4.6 | 4.6 | 4.6 | 4.6 | 4.6 | 4.6 |

TABLE 11

|  |  | Example 41 | Example 42 | Example 43 | Example 44 | Example 45 | Example 46 | Example 47 | Example 48 |
|---|---|---|---|---|---|---|---|---|---|
| Composition | First HC coating material | H1-1 | H1-1 | H1-1 | H1-17 | H1-18 | H1-19 | H1-20 | H1-21 |
|  | Thickness of first HC μm | 2 | 2 | 2 | 2 | 2 | 2 | 2 | 2 |
|  | Second HC coating material | H2-1 | H2-1 | H2-1 | H2-1 | H2-1 | H2-1 | H2-1 | H2-1 |
|  | Thickness of second HC μm | 18 | 25 | 35 | 22 | 22 | 22 | 22 | 22 |
|  | Transparent resin film | a-1 | a-1 | a-1 | a-1 | a-1 | a-1 | a-1 | a-1 |
| Evaluation results | Total light transmittance % | 91.9 | 91.6 | 91.1 | 91.1 | 91.5 | 91.2 | 89.5 | 89.2 |
|  | Pencil hardness | 7H | 7H | 9H | 7H | 7H | 7H | 7H | 7H |
|  | Yellowness index | 0.3 | 0.3 | 0.3 | 0.3 | 0.3 | 0.3 | 0.3 | 0.3 |
|  | Water contact angle deg | 116 | 116 | 116 | 115 | 115 | 113 | 114 | 114 |
|  | Abrasion resistance 1 | A | A | A | D | E | E | C | A |
|  | Abrasion resistance 2 | A | A | A | A | A | A | E | F |
|  | Surface smoothness | ◎ | ◎ | ◎ | ◎ | ◎ | ◎ | ◎ | ◎ |
|  | Square lattice pattern test | Classification 0 | Classification 0 | Classification 0 | Classification 0 | Classification 0 | Classification 0 | Classification 0 | Classification 0 |
|  | Minimum bending radius mm | 30 | 35 | 70 | 30 | 30 | 30 | 30 | 30 |
|  | Cutting processability | ◎-◎ | ◎-◎ | ◎-◎ | ◎-◎ | ◎-◎ | ◎-◎ | ◎-◎ | ◎-◎ |
|  | Weather resistance | ◎ | ◎ | ◎ | ◎ | ◎ | ◎ | ◎ | ◎ |
|  | Haze % | 0.3 | 0.3 | 0.3 | 7.5 | 1.4 | 3.0 | 14.5 | 21.7 |
|  | Y value of XYZ colorimetric system % | 4.6 | 4.6 | 4.6 | 2.6 | 4.1 | 3.1 | 1.8 | 1.6 |

TABLE 12

|  |  | Example 49 | Example 50 | Example 51 | Example 52 | Example 53 | Example 54 | Example 55 |
|---|---|---|---|---|---|---|---|---|
| Composition | First HC coating material | H1-22 | H1-23 | H1-24 | H1-25 | H1-26 | H1-27 | H1-28 |
|  | Thickness of first HC μm | 2 | 2 | 2 | 2 | 2 | 2 | 10 |
|  | Second HC coating material | H2-1 | H2-1 | H2-1 | H2-1 | H2-1 | H2-1 | — |
|  | Thickness of second HC μm | 22 | 22 | 22 | 22 | 22 | 22 | — |
|  | Transparent resin film | a-1 | a-1 | a-1 | a-1 | a-1 | a-1 | a-1 |
| Evaluation results | Total light transmittance % | 86.2 | 90.6 | 89.6 | 91.0 | 90.8 | 90.7 | 92.0 |
|  | Pencil hardness | 7H | 7H | 6H | 6H | 5H | 6H | 5H |
|  | Yellowness index | 0.3 | 0.3 | 0.3 | 0.3 | 0.3 | 0.3 | 0.3 |
|  | Water contact angle deg | 111 | 111 | 112 | 114 | 113 | 113 | 116 |
|  | Abrasion resistance 1 | A | D | E | E | E | E | A |
|  | Abrasion resistance 2 | F | A | A | A | C | E | A |
|  | Surface smoothness | ◎ | ◎ | ◎ | ◎ | ○ | ◎ | ◎ |
|  | Square lattice pattern test | Classification 0 | Classification 0 | Classification 0 | Classification 0 | Classification 0 | Classification 0 | Classification 0 |
|  | Minimum bending radius mm | 40 | 30 | 30 | 30 | 30 | 30 | 30 |
|  | Cutting processability | ◎-◎ | ◎-◎ | ◎-◎ | ◎-◎ | ◎-◎ | ◎-◎ | ◎-◎ |
|  | Weather resistance | ◎ | ◎ | ◎ | ◎ | ◎ | ◎ | ◎ |
|  | Haze % | 35.2 | 8.2 | 5.8 | 3.2 | 5.4 | 7.8 | 0.3 |
|  | Y value of XYZ colorimetric system % | 1.4 | 2.5 | 3.2 | 4.0 | 3.5 | 3.0 | 4.6 |

From these experimental results, it has been found that a preferable hard coat laminated film according to at least one embodiment generally is excellent in abrasion resistance, surface hardness, transparency, color tone, lubricity, surface appearance, adhesiveness between layers, bending resistance, cutting processability, and weather resistance. In addition, it has been found that a hard coat laminated film according to at least one embodiment exhibits a good antiglare property. Therefore, the hard coat laminated film according to at least one embodiment can be suitably used as a member of an image display apparatus such as a liquid crystal display, a plasma display, or an electroluminescence display (including an image display apparatus having a touch panel function and an image display apparatus having no touch panel function), particularly as a display face plate of an image display apparatus having a touch panel function.

REFERENCE SIGNS LIST

1 First hard coat
2 Second hard coat
3 Layer (α1) of the (α) acrylic resin
4 Layer (β) of aromatic polycarbonate resin
5 Layer (α2) of the (α) acrylic resin
6 Third hard coat
7 Melted resin film
8 T-die
9 First mirror-finished roll
10 Second mirror-finished roll
11 Ultraviolet irradiator
12 Mirror-finished metal roll
13 Web
14 Holding angle

The invention claimed is:

1. A hard coat laminated film sequentially, comprising, from a surface layer side, a first hard coat and a resin film layer,
   wherein the first hard coat is formed of a coating material comprising:
      (A) 100 parts by mass of a polyfunctional (meth) acrylate (A); and
      (B) 0.01 to 7 parts by mass of a water repellent agent (B), and containing no inorganic particles, and
   wherein the resin film comprises (a) at least one layer of an acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, and
   wherein the only copolymer contained in the resin film is the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer.

2. The hard coat laminated film according to claim 1, wherein the resin film is a multilayer resin film obtained by sequentially laminating:
   (α) a layer of the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer;
(β) a layer of an aromatic polycarbonate resin; and
(α) a layer of the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, directly in this order.

3. The hard coat laminated film according to claim 1, wherein the resin film is a multilayer resin film obtained by sequentially laminating:
(α) a layer of the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer;
(γ) a layer of a resin composition comprising 100 parts by mass of an acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, and 1 to 100 parts by mass of a core-shell rubber; and
(α) a layer of the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, directly in this order.

4. The hard coat laminated film according to claim 1, wherein the (B) water repellent agent comprises a (meth) acryloyl group-containing fluoropolyether water repellent agent.

5. The hard coat laminated film according to claim 1, wherein the first hard coat forming coating material further comprises (F) 0.01 to 15 parts by mass of resin fine particles having an average particle diameter of 0.5 to 10 μm.

6. An article comprising the hard coat laminated film according to claim 1.

7. The hard coat laminated film according to claim 1, wherein a sum of the amount of the monomer polymerized from methyl methacrylate and the amount of the monomer polymerized from vinylcyclohexane is 99% by mole or more relative to 100% by mole of the total amount of monomers polymerized in the at least one layer of the acrylic polymer.

8. A hard coat laminated film sequential, comprising, from a surface layer side, a first hard coat, a second hard coat, and a resin film layer,
wherein the first hard coat is formed of a coating material comprising:
(A) 100 parts by mass of a polyfunctional (meth) acrylate;
(B) 0.01 to 7 parts by mass of a water repellent agent; and
(C) 0.01 to 10 parts by mass of a silane coupling agent, and containing no inorganic particles,
wherein the second hard coat is formed of a coating material comprising:
(A) 100 parts by mass of a polyfunctional (meth) acrylate; and
(D) 50 to 300 parts by mass of inorganic fine particles having an average particle diameter of 1 to 300 nm, and
wherein the resin film comprises (α) at least one layer of an acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, and
wherein the only copolymer contained in the resin film is the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer.

9. The hard coat laminated film according to claim 8, wherein the (C) silane coupling agent comprises one or more selected from the group consisting of a silane coupling agent having an amino group and a silane coupling agent having a mercapto group.

10. The hard coat laminated film according to claim 8, wherein the second hard coat forming coating material further comprises (E) 0.01 to 1 part by mass of a leveling agent.

11. The hard coat laminated film according to claim 8, wherein the thickness of the first hard coat is from 0.5 to 5 μm.

12. The hard coat laminated film according to claim 8, wherein the thickness of the second hard coat is from 5 to 30 μm.

13. The hard coat laminated film according to claim 8, wherein a sum of the amount of the monomer polymerized from methyl methacrylate and the amount of the monomer polymerized from vinylcyclohexane is 99% by mole or more relative to 100% by mole of the total amount of monomers polymerized in the at least one layer of the acrylic polymer.

14. A hard coat laminated film sequentially, comprising, from a surface layer side, a first hard coat, a second hard coat, and a resin film layer,
wherein the first hard coat is formed of a coating material containing no inorganic particles,
wherein the second hard coat is formed of a coating material containing inorganic particles,
wherein the resin film comprises (α) at least one layer of an acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer,
wherein the only copolymer contained in the resin film is the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, and
wherein the following (i) to (iii) are satisfied:
(i) a total light transmittance of 85% or more;
(ii) a pencil hardness on the first hard coat surface of 5 H or more; and
(iii) a yellowness index of 3 or less.

15. The hard coat laminated film according to claim 14, wherein the resin film is a multilayer resin film obtained by sequentially laminating:
(α) a layer of the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer;

(β) a layer of an aromatic polycarbonate resin; and (α) a layer of the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, directly in this order.

16. The hard coat laminated film according to claim 14, wherein the resin film is a multilayer resin film obtained by sequentially laminating:

(α) a layer of the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer;

(γ) a layer of a resin composition comprising 100 parts by mass of an acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, and 1 to 100 parts by mass of a core-shell rubber; and (α) a layer of the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, directly in this order.

17. The hard coat laminated film according to claim 14, wherein a sum of the amount of the monomer polymerized from methyl methacrylate and the amount of the monomer polymerized from vinylcyclohexane is 99% by mole or more relative to 100% by mole of the total amount of monomers polymerized in the at least one layer of the acrylic polymer.

18. A hard coat laminated film sequentially, comprising, from a surface layer side, a first hard coat, a second hard coat, and a resin film layer,
wherein the first hard coat is formed of a coating material containing no inorganic particles,
wherein the second hard coat is formed of a coating material containing inorganic particles,
wherein the resin film comprises (α) at least one layer of an acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer,
wherein the only copolymer contained in the resin film is the acrylic polymer comprising 50 to 95% by mole of a monomer polymerized from methyl methacrylate and 50 to 5% by mole of a monomer polymerized from vinylcyclohexane relative to 100% by mole of the total amount of monomeric units in the acrylic polymer, and
wherein the following (iv) and (v) are satisfied:
(iv) a water contact angle at the first hard coat surface of 100° or more; and
(v) a water contact angle at the first hard coat surface after 20,000 reciprocating wipes with a cotton of 100° or more.

19. The hard coat laminated film according to claim 18, wherein a sum of the amount of the monomer polymerized from methyl methacrylate and the amount of the monomer polymerized from vinylcyclohexane is 99% by mole or more relative to 100% by mole of the total amount of monomers polymerized in the at least one layer of the acrylic polymer.

* * * * *